US011288667B2

(12) United States Patent
Kang et al.

(10) Patent No.: US 11,288,667 B2
(45) Date of Patent: Mar. 29, 2022

(54) ELECTRONIC DEVICE AND METHOD FOR CONTROLLING WIRELESS COMMUNICATION CONNECTION THEREOF

(71) Applicant: SAMSUNG ELECTRONICS CO., LTD., Suwon-si (KR)

(72) Inventors: Min-Ho Kang, Suwon-si (KR); Jinhyun Park, Suwon-si (KR); Ye-Ji Yoon, Suwon-si (KR); Jun-Hak Lim, Suwon-si (KR); Wontae Chae, Suwon-si (KR); Jongmu Choi, Gunpo-si (KR); Bokun Choi, Seoul (KR); Doo-Suk Kang, Suwon-si (KR); Sun-Kee Lee, Seongnam-si (KR); Moonsoo Kim, Seoul (KR); Eun Jung Hyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 16/492,310

(22) PCT Filed: Mar. 7, 2018

(86) PCT No.: PCT/KR2018/002718
§ 371 (c)(1),
(2) Date: Sep. 9, 2019

(87) PCT Pub. No.: WO2018/164486
PCT Pub. Date: Sep. 13, 2018

(65) Prior Publication Data
US 2021/0090080 A1 Mar. 25, 2021

(30) Foreign Application Priority Data
Mar. 8, 2017 (KR) .................. 10-2017-0029358
Oct. 17, 2017 (KR) .................. 10-2017-0134780

(51) Int. Cl.
*G06Q 20/40* (2012.01)
*H04W 12/069* (2021.01)
(Continued)

(52) U.S. Cl.
CPC ............ *G06Q 20/40* (2013.01); *G06Q 20/32* (2013.01); *G06Q 20/382* (2013.01); *H04W 12/069* (2021.01); *H04W 48/02* (2013.01)

(58) Field of Classification Search
None
See application file for complete search history.

(56) References Cited

U.S. PATENT DOCUMENTS 9,049,567 B2 * 6/2015 Le Guen ............ H04L 12/2807
9,961,553 B2 * 5/2018 Fan ...................... H04W 12/08
(Continued)

FOREIGN PATENT DOCUMENTS

JP     2011-133948     7/2011
KR   10-2005-0051050     6/2005
(Continued)

OTHER PUBLICATIONS

"Part 11: Wireless LAN Medium Access Control (MAC) and Physical Layer (PHY) Specifications", IEEE Standards Association, IEEE Computer Society, IEEE Std. 802.11, Mar. 29, 2012, 2793 pages.
(Continued)

*Primary Examiner* — Christopher Bridges

(57) ABSTRACT

Various embodiments of the disclosure relate to an electronic device and a wireless communication connection control method thereof. The method may include: receiving and storing at least one first account information stored in at least one server from a first electronic device via the wireless communication circuit; broadcasting a beacon signal including an indicator indicating that a WiFi access is granted
(Continued)

based at least in part on account information related to the server via the wireless communication circuit; receiving at least one second account information from a neighboring electronic device which has received the beacon signal; determining whether the second account information is related to the first account information, based at least in part on data to be exchanged with the server via the wired communication interface; and upon determining that the second account information is related to the first account information, granting the neighboring electronic device an access to the access point in order to use the Internet, without having to request for credential information from the neighboring electronic device. Various other embodiments are also possible.

18 Claims, 17 Drawing Sheets

(51) Int. Cl.
    *G06Q 20/32*           (2012.01)
    *G06Q 20/38*           (2012.01)
    *H04W 48/02*          (2009.01)

(56) References Cited

U.S. PATENT DOCUMENTS

| | | | | |
|---|---|---|---|---|
| 9,990,681 | B2 * | 6/2018 | Ong | H04L 63/108 |
| 10,356,651 | B2 * | 7/2019 | Conant | H04W 28/0231 |
| 10,721,610 | B2 * | 7/2020 | Qin | H04W 4/24 |
| 10,764,934 | B2 * | 9/2020 | Ren | H04W 48/16 |
| 2005/0091539 | A1 * | 4/2005 | Wang | G06F 21/41 |
| | | | | 726/4 |
| 2006/0031436 | A1 * | 2/2006 | Sakata | H04L 67/2838 |
| | | | | 709/221 |
| 2007/0180499 | A1 | 8/2007 | Van Bemmel | |
| 2009/0064283 | A1 * | 3/2009 | Chen | H04L 63/18 |
| | | | | 726/4 |
| 2009/0197571 | A1 * | 8/2009 | Kitajima | H04W 12/0431 |
| | | | | 455/411 |
| 2011/0026436 | A1 * | 2/2011 | Karaoguz | H04L 65/103 |
| | | | | 370/254 |
| 2013/0024915 | A1 | 1/2013 | Jones et al. | |
| 2013/0067081 | A1 | 3/2013 | Liu et al. | |
| 2014/0010222 | A1 | 1/2014 | Chen et al. | |
| 2014/0050167 | A1 * | 2/2014 | Smedman | H04W 48/16 |
| | | | | 370/329 |
| 2014/0137206 | A1 | 5/2014 | Hansmann et al. | |
| 2014/0282960 | A1 * | 9/2014 | Tinnakornsrisuphap | |
| | | | | H04L 63/08 |
| | | | | 726/7 |
| 2014/0348152 | A1 | 11/2014 | Vanderhulst | |
| 2015/0012640 | A1 | 1/2015 | Toksvig et al. | |
| 2015/0012970 | A1 | 1/2015 | Toksvig et al. | |
| 2015/0128219 | A1 | 5/2015 | Guday et al. | |
| 2016/0057626 | A1 | 2/2016 | O'Toole et al. | |
| 2016/0073259 | A1 * | 3/2016 | Lee | H04L 12/2803 |
| | | | | 715/734 |
| 2016/0143028 | A1 | 5/2016 | Mancuso et al. | |
| 2016/0308862 | A1 * | 10/2016 | Rolfe | H04L 9/3228 |

FOREIGN PATENT DOCUMENTS

| | | |
|---|---|---|
| KR | 10-2008-0093431 | 10/2008 |
| KR | 10-2014-0054393 | 5/2014 |
| KR | 10-2014-0064957 | 5/2014 |
| KR | 10-2015-0020698 | 2/2015 |
| KR | 10-2016-0027180 | 3/2016 |
| KR | 10-2016-0027181 | 3/2016 |
| KR | 10-2016-0082696 | 7/2016 |
| KR | 10-2016-0089550 | 7/2016 |

OTHER PUBLICATIONS

International Search Report for PCT/KR2018/002718 dated Jun. 26, 2018, 4 pages.
Written Opinion of the ISA for PCT/KR2018/002718 dated Jun. 26, 2018, 11 pages.

* cited by examiner

ELECTRONIC DEVICE AND METHOD FOR CONTROLLING WIRELESS COMMUNICATION CONNECTION THEREOF

This application is the U.S. national phase of International Application No. PCT/KR2018/002718, filed on Mar. 7, 2018 which designated the U.S. and claims priorities to Korean Patent Application No. 10-2017-0029358, filed on Mar. 8, 2017, and Korean Patent Application No. 10-2017-0134780, filed on Oct. 17, 2017, the entire contents of each of which are hereby incorporated by reference.

TECHNICAL FIELD

Various embodiments of the disclosure relate to an electronic device and a method for controlling a wireless communication connection thereof.

BACKGROUND ART

Electronic devices (e.g., a mobile terminal, a smart phone, a wearable electronic device, etc.) may provide various functions. For example, the smart phone may provide short-range wireless communication (e.g., Bluetooth, Wireless Fidelity (Wi-Fi), Near Field Communication (NFC), etc.), mobile communication ($3^{rd}$ Generation (3G), $4^{th}$ Generation (4G), $5^{th}$ Generation (5G), etc.), a music or video playback function, an image capturing function, a navigation function, a messenger function, or the like.

Electronic devices supporting the short-range wireless communication may access a wireless router to use the Internet. For example, the electronic device may search for wireless routers located nearby, and may establish a short-range wireless communication connection with one of the found wireless routers. In this case, a wireless router for which security is set may request for credential information (e.g., a password). The electronic devices may transmit to the wireless router the password which is input by a user. The wireless router may grant an access of the electronic device when the credential information (e.g., the password) received from the electronic device is matched.

SUMMARY

The aforementioned conventional wireless communication connection method has an inconvenience in that users need to know in advance a password for accessing a wireless router. In addition, users of the electronic device inconveniently have to enter a password when an initial connection is established (or when the password is changed). In addition, the aforementioned conventional wireless communication connection method may have difficulty in managing the access of the wireless router for each electronic device since one password is equally used by all electronic devices.

Various embodiments of the disclosure for solving the aforementioned problems may provide an electronic device capable of controlling an access by using authentication association information (e.g., account information, reservation information, payment information, etc.) between an administrator of a wireless router and a user of the electronic device intending to access the router, and a wireless communication connection control method thereof.

In addition, various embodiments of the disclosure may provide an electronic device capable of managing an access (e.g., an access period, a number of times, etc.) of an electronic device by using authentication association information (e.g., reservation information or payment information).

An electronic device according to various embodiments of the disclosure may include: a housing; and an access point inside the housing. The access point may include: a wired communication interface configured to be coupled to the Internet; a wireless communication circuit configured to support a WiFi protocol; a processor operatively coupled to the wired communication interface and the wireless communication circuit; and a memory operatively coupled to the processor. The memory may store instructions, when executed, for allowing the processor to: receive at least one first account information stored in at least one server from a first electronic device via the wireless communication circuit; store the first account information in the memory; broadcast a beacon signal including an indicator indicating that a WiFi access is granted based at least in part on account information related to the server via the wireless communication circuit; receive at least one second account information from a second electronic device via the wireless communication circuit; determine whether the second account information is related to the first account information, based at least in part on data to be exchanged with the server via the wired communication interface; and upon determining that the second account information is related to the first account information, grant the second electronic device an access to the access point in order to use the Internet, without having to request for credential information from the second electronic device.

An electronic device according to various embodiments of the disclosure may include: a housing; and an access point inside the housing. The access point may include: a wired communication interface configured to be coupled to the Internet; a wireless communication circuit configured to support a WiFi protocol; a processor operatively coupled to the wired communication interface and the wireless communication circuit; and a memory operatively coupled to the processor. The memory may store instructions, when executed, for allowing the processor to: receive at least one account information related to at least one reservation server from a first electronic device via the wireless communication circuit; log in to the reservation server by using the at least one account information; receive an enable request, including at least one first reservation information, for a function which grants a WiFi access, based at least in part on reservation information, from the reservation server; store the first reservation information in the memory; after enabling the function, broadcast a beacon signal including an indicator indicating that a WiFi access is granted based at least in part on reservation information via the wireless communication circuit; receive at least one second reservation information from a second electronic device via the wireless communication circuit; determine whether the second reservation information is related to the first reservation information, based at least in part on data to be exchanged with the reservation server via the wired communication interface; and upon determining that the second reservation information is related to the first reservation information, grant the second electronic device an access to the access point in order to use the Internet, without having to request for credential information from the second electronic device.

An electronic device according to various embodiments of the disclosure may include: a housing; and an access point inside the housing. The access point may include: a wired communication interface configured to be coupled to the Internet; a wireless communication circuit configured to support a WiFi protocol; a processor operatively coupled to the wired communication interface and the wireless communication circuit; and a memory operatively coupled to the processor. The memory may store instructions, when executed, for allowing the processor to: connect a communication channel with a first electronic device coupled with a payment server via the wireless communication circuit; receive at least one first payment approval information from the first electronic device; store the first payment approval information in the memory; broadcast a beacon signal including an indicator indicating that a WiFi access is granted based at least in part on payment approval information via the wireless communication circuit; receive at least one second payment approval information from a second electronic device via the wireless communication circuit; determine whether the second payment approval information is related to the first payment approval information, and upon determining that the second account information is related to the first account information, grant the second electronic device an access to the access point in order to use the Internet, without having to request for credential information from the second electronic device.

A wireless communication connection control method of an electronic device according to various embodiments of the disclosure may include: receiving and storing at least one first account information stored in at least one server from a first electronic device; broadcasting a beacon signal including an indicator indicating that a WiFi access is granted based at least in part on account information related to the server; receiving at least one second account information from a neighboring electronic device which has received the beacon signal; determining whether the second account information is related to the first account information, based at least in part on data to be exchanged with the server; and upon determining that the second account information is related to the first account information, granting the neighboring electronic device an access to the access point in order to use the Internet, without having to request for credential information from the neighboring electronic device.

A wireless communication connection control method of an electronic device according to various embodiments of the disclosure may include: logging in to at least one reservation server by using at least one account information related to the reservation server; receiving an enable request, including at least one first reservation information, for a function which grants a WiFi access, based at least in part on reservation information, from the reservation server; storing the first reservation information; after enabling the function, broadcasting a beacon signal including an indicator indicating that a WiFi access is granted based at least in part on the reservation information; receiving at least one second reservation information from a neighboring electronic device; determining whether the second reservation information is related to the first reservation information, based at least in part on data to be exchanged with the reservation server; and upon determining that the second reservation information is related to the first reservation information, granting the neighboring electronic device an access to the access point in order to use the Internet, without having to request for credential information from the neighboring electronic device.

A wireless communication connection control method of an electronic device according to various embodiments of the disclosure may include: receiving and storing at least one first payment approval information from a first electronic device coupled with a payment server; broadcasting a beacon signal including an indicator indicating that a WiFi access is granted based at least in part on payment approval information; receiving at least one second payment approval information from a second electronic device; determining whether the second payment approval information is related to the first payment approval information, and upon determining that the second account information is related to the first account information, granting the second electronic device an access to the access point in order to use the Internet, without having to request for credential information from the second electronic device.

An electronic device (e.g., a wireless router) according to various embodiments of the disclosure can automatically grant an access of an external electronic device by using authentication association information without having to require an input of additional credential information (e.g., a password). For example, the wireless router can grant the access in case of an electronic device of a user (e.g., a friend) registered to social account information of an administrator. Alternatively, a wireless router installed in accommodations such as a hotel or an inn can grant a wireless communication connection for an electronic device of a subscriber by using reservation information. The wireless router can grant an access of the electronic device of the subscriber by using the reservation information only during a reservation period. Accordingly, the wireless router can effectively manage resources.

Alternatively, a wireless router installed in a commercial place such as a café can grant an access for an electronic device of a purchaser by using payment information. The wireless router can grant the access for a specific time (e.g., one hour) with respect to a payment time, or can grant the access during a specific number of times (e.g., one time). Accordingly, the wireless router can effectively manage resources.

DETAILED DESCRIPTION OF EXAMPLE EMBODIMENTS

Figure 1:
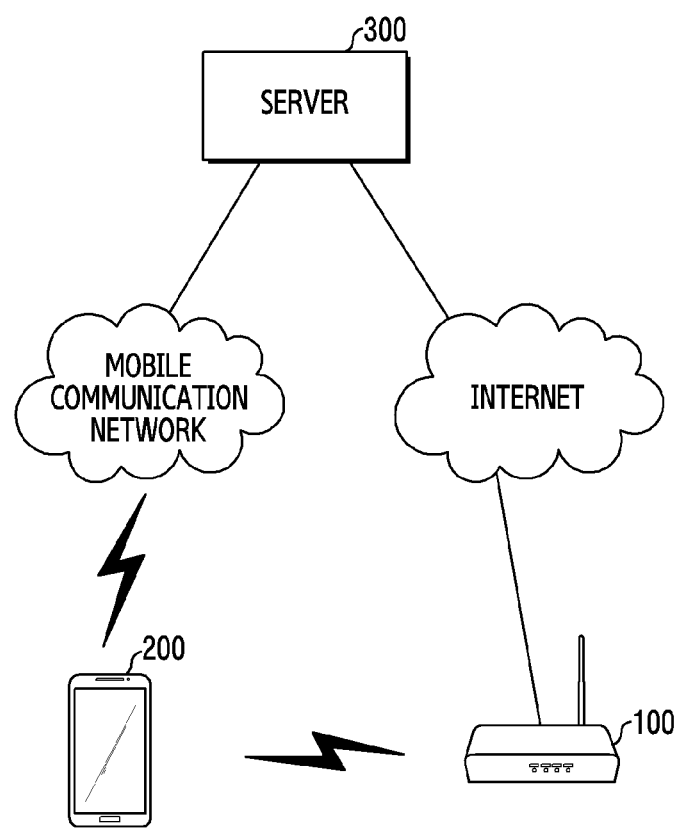
FIG. 1 illustrates a wireless communication system according to an embodiment of the disclosure.

Hereinafter, various embodiments of the present disclosure will be described with reference to the accompanying drawings. Various embodiments and terms used herein do not limit various embodiments of the present disclosure to the particular forms, and should be understood to include various modifications, equivalents, and/or alternatives of the corresponding embodiments. In the description of the drawings, identical or similar reference numerals are used to designate identical or similar elements. It is to be understood that the singular forms may include plural referents unless the context clearly dictates otherwise. In the present disclosure, an expression such as "A or B," or "at least one of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor) that can perform a corresponding operation by executing at least one software program stored at a memory device.

An electronic device according to embodiments of the present disclosure, may be embodied as, for example, at least one of a wire/wireless router, a wireless router, a Wi-Fi router, a repeater, a portable repeater, or an internet router, that comprise an access point. In another embodiment, the electronic device may be embodied at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device that provide a hotspot function. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung Home-Sync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

FIG. 1 illustrates a wireless communication system according to an embodiment of the disclosure.

Referring to FIG. 1, a wireless communication system according to an embodiment of the disclosure may include a first electronic device 100, a second electronic device 200, and a server 300.

The first electronic device 100 according to an embodiment of the disclosure may be a router capable of connecting a plurality of networks (e.g., a Local Area Network (LAN)) and another LAN, or a LAN and a Wide Area Network (WAN)). For example, the first electronic device 100 may include an Access Point (AP) which converts a wireless signal into a wired signal or converts a wired signal into a wireless signal.

According an embodiment of the disclosure, the first electronic device 100 may be coupled to the Internet via a wired communication interface, and may convert a wired signal received via the Internet into a wireless signal and transmit it to a neighboring electronic device (e.g., the second electronic device 200). In addition, the first electronic device 100 may establish a wireless communication connection with the neighboring electronic device (e.g., the second electronic device 200) via a wireless communication circuit, and may convert the wireless signal received from the neighboring electronic device into the wired signal and transmit it to a destination (e.g., the server 300) via the Internet. The wireless communication circuit may support a Wireless Fidelity (WiFi) protocol.

The first electronic device 100 according to an embodiment of the disclosure may use authentication association information to control a wireless access of the second electronic device 200. For example, the first electronic device 100 may use at least one first authentication association information to control the access of the second electronic device 200. The first authentication association information is information related to the server 300, and may include account information, reservation information, and/or payment information or the like. Herein, the server 300 may be a server for providing extra services (e.g., a web service, a social service, a reservation service, a payment service, etc.), other than a server (e.g., an Authentication, Authorization, Accounting (AAA) server) provided separately for authentication.

According to an embodiment of the disclosure, the first electronic device 100 may receive first authentication association information, in a wired or wireless manner, registered from a user (e.g., an administrator of the first electronic device 100). For example, the first electronic device 100 may include a web User Interface (UI) including a management menu for storing the first authentication association information registered from the user. The user may register the first authentication association information to the first electronic device 100 by accessing the management menu via a desktop, notebook, smart phone, tablet PC, or the like coupled in a wired or wireless manner. According to another embodiment, the first electronic device 100 may be managed via a separate cloud server (not shown), a web portal server (not shown), or the like. For example, the user may register the first authentication association information to the first electronic device 100 by accessing the cloud server (not shown) or the web portal server (not shown) via a web browser or a mobile app or the like.

The first electronic device 100 to which the at least one first authentication information is input may generate and broadcast a beacon signal including an indicator indicating that an access is granted (or grantable) based at least in part on authentication association information related to the server 300. For example, the indicator may indicate that the second electronic device 200 is in a state where an access to the first electronic device 100 is available by using information associated with the server 300 (e.g., account information associated with a social service server, reservation information associated with a reservation server, payment information associated with a payment server).

The first electronic device 100 may receive a response signal for the beacon signal from a neighboring electronic device (e.g., the second electronic device 200) via a wireless communication circuit. The response signal may include at least one second authentication association information. The second authentication association information may include account information, reservation information, and/or payment information stored in the second electronic device 200.

The first electronic device 100 may determine whether the first authentication association information and the second authentication association information are related to each other. For example, the first electronic device 100 may determine whether the first authentication association information and the second authentication association information are related to each other, based at least in part on data to be exchanged with the server 300. The first electronic device 100 may use an Application Programming Interface (API) associated with the server 300 to exchange data with the server 300. Specifically, if the first authentication association information and the second authentication association information are account information, the first electronic device 100 may identify whether second account information received from the second electronic device 200 is included (registered) in a specific group list (e.g., a friend list) of the stored first account information. For example, if the first account information and the second account information are accounts of Facebook™, the first electronic device 100 may transmit the second account information to a Facebook server, and may request to identify whether the second account information (e.g., a Facebook ID of a second user) is included in the friend list of the first account information. Alternatively, the first electronic device 100 may receive and store the friend list from the Facebook server, and may identify whether the second account information exists in the received friend list.

If the first authentication association information and the second authentication association information are reservation information, the first electronic device 100 may transmit second reservation information, received from the second electronic device 200, to the reservation server to identify whether the second reservation information exists in a reservation list corresponding to the first reservation information. Alternatively, if the first authentication association information and the second authentication association information are payment information, the first electronic device 100 may compare first payment information stored and received from the payment server and second payment information received from the second electronic device 200 to identify whether a payer is correct.

Upon determining that the first authentication association information and the second authentication association information are related to each other, the first electronic device 100 may grant an access of the second electronic device 200. For example, the first electronic device 100 may grant the second electronic device 200 an access to an access point in order to use the Internet, without having to additionally request the second electronic device 200 to transmit credential information.

The second electronic device 200 may be an electronic device intending to establish a wireless communication connection with the first electronic device 100. For example, the second electronic device 200 may be an electronic device supporting short-range wireless communication, such as a smart phone, a notebook, a tablet PC, a wearable electronic device, or the like. Upon receiving a beacon signal which is broadcast by the first electronic device, the second electronic device 200 may transmit a response signal thereof to the first electronic device 100. The response signal may include at least one second authentication association information.

Since it is determined by the first electronic device 100 that the second authentication association information is related to the first authentication association information, the second electronic device 200 may automatically access the first electronic device 100

The server 300 may store and manage authentication association information. For example, the server 300 may include a social service server, reservation server, or payment server related to the first authentication association information. Upon receiving a transmission request of relation information (e.g., a friend list) for the first authentication association information from the first electronic device 100, the server 300 may transmit a relation list to the first electronic device 100. According to another embodiment, upon receiving from the first electronic device 100 a query regarding whether the second account information is related to the first account information, the server 300 may identify a relationship (e.g., identify whether it is included in the friend list), and may transmit a response signal for the query to the first electronic device 100. For example, the server 300 may identify whether an IDentifier (ID) of the second account information is included in the friend list of the first account information, and may transmit an identification result to the first electronic device 100.

According to some embodiments, the server 300 may further receive device information capable of identifying the second electronic device 200 to identify whether the second electronic device 200 logs in to a server corresponding to the second account information.

Although it is illustrated and described in FIG. 1 that the first electronic device 100 is the wireless router, the first electronic device 100 may be various electronic devices (e.g., a smart phone, a tablet PC, etc.) which provide a hotspot function. For example, if the first electronic device 100 is the smart phone, a signal may be transmitted/received with respect to the server 300 via a mobile communication module, and a signal may be transmitted/received with respect to the second electronic device 200 via the wireless communication module. In other words, if the first electronic device 100 is the smart phone, a wired communication interface may be replaced with the mobile communication module.

An electronic device (e.g., the first electronic device 100) according to various embodiments of the disclosure may use authentication association information related to the server 300 to automatically establish a wireless communication connection even if it is an electronic device (e.g., the second electronic device 200) not having an access history. In general, the authentication association information may be information provided (or used) for another purpose (e.g., a social service, a web service, a reservation service, or a payment service), other than authentication information for the wireless communication connection.

Hereinafter, a wireless communication connection control procedure of the wireless communication system will be described in detail for each of cases where the first authentication association information and the second authentication association information are account information, reservation information, and payment information.

Figure 2:
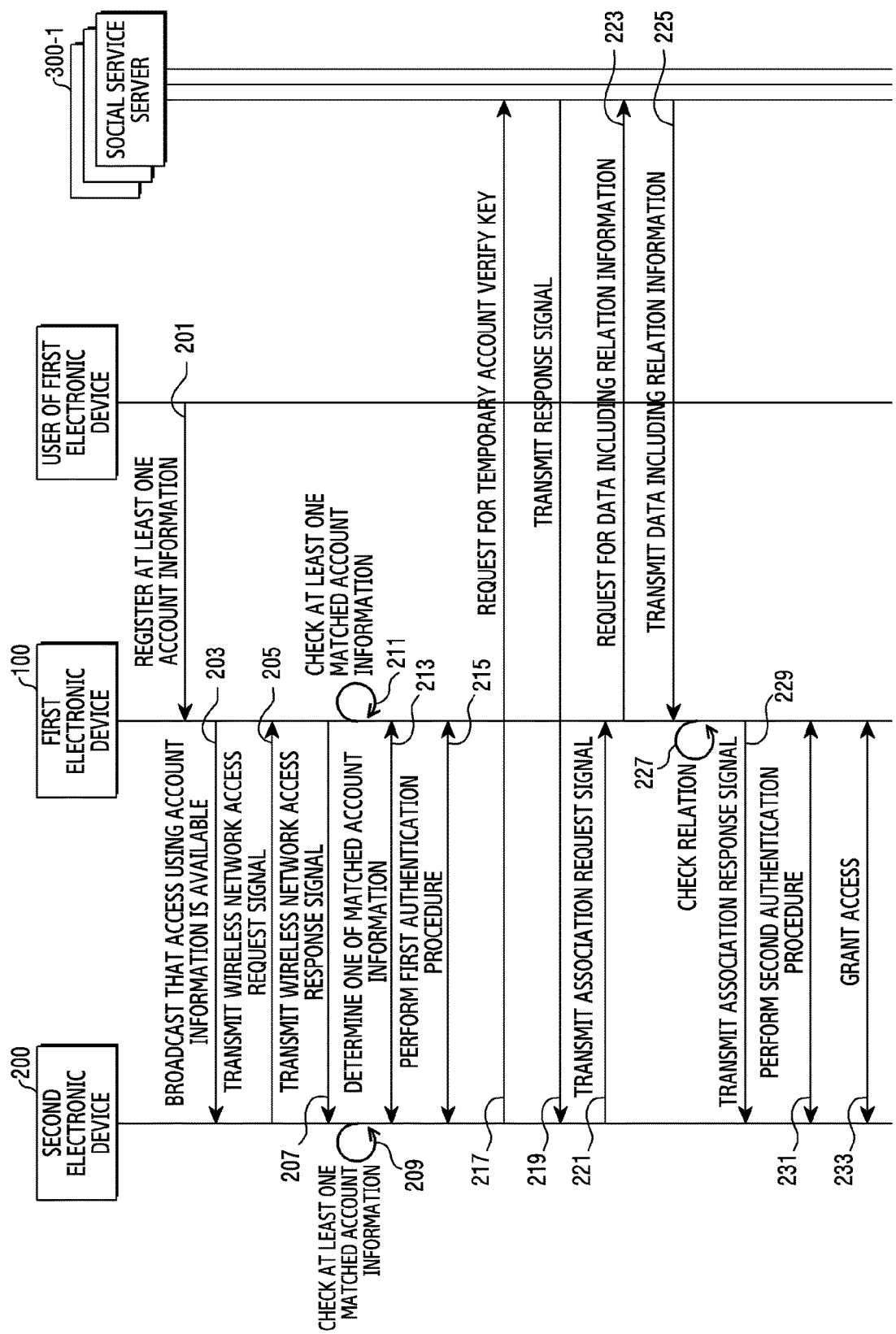
FIG. 2 is a flowchart illustrating a procedure in which a wireless communication system controls a wireless communication connection by using account information according to an embodiment of the disclosure.

FIG. 2 is a flowchart illustrating a procedure in which a wireless communication system controls a wireless communication connection by using account information according to an embodiment of the disclosure.

Referring to FIG. 2, in operation 201, a user (or an administrator) of the first electronic device 100 of a wireless communication system according to an embodiment of the disclosure may register at least one account information (hereinafter, first account information) to the first electronic device 100. The first account information may be information used to read relation information from a server (e.g., a social service server 300-1). For example, the first account information may include at least one of an identifier (e.g., a name or an address (Uniform Resource Location (URL)) of a social network service (e.g., Facebook™, Twitter™, etc.), a user ID (hereinafter, a first user ID), a password, an access token, and a temporary account verify key.

At least part of the account information may be used to identify the relation information. For example, upon identifying the relation information by logging in to the social service server 300-1, the first electronic device 100 may use the user ID and the password or use the access token to log in to the social service server 300-1. The access token may be received and stored when the first electronic device 100 logs in to the social service server 300-1. In other words, the first electronic device 100 may use the access token to access the social service server 300-1 without an additional login procedure when in a state of logging in to the social service server 300-1.

According to another embodiment, upon identifying only the relation information without having to log in to the social service server 300-1, the first electronic device 100 may use the user ID and the temporary account verify key to access the social service server 300-1 and identify only the relation information. The temporary account verify key is information used in a limited manner to identify the relation, and may be issued only to an authenticated user.

Meanwhile, the first account information according to an embodiment of the disclosure is not limited to account information of a social network service, and may be account information such as various web services, cloud services, or the like.

In operation 203, the first electronic device 100 according to an embodiment of the disclosure may broadcast that an access of wireless communication (e.g., WiFi) is grantable (or granted) based at least in part on the account information. For example, the first electronic device 100 may generate and broadcast a beacon signal including an indicator indicating that the access of the wireless communication is grantable (or granted) based on the account information. The beacon signal may include the indicator in a Vendor-Specific Information Element (VSIE) which is an option field of the beacon frame according to a WiFi communication standard. A packet structure of the beacon frame is defined in the WiFi communication standard, and thus descriptions thereof will be omitted.

In operation 205, upon receiving the broadcasting beacon signal, the second electronic device 200 according to an embodiment of the disclosure may transmit a wireless network access request signal (e.g., a probe request signal) to the first electronic device 100. The wireless network access request signal may include at least one account information (hereinafter, second account information) supported by the second electronic device 200. For example, the wireless network access request signal may include at least one second account information in the VSIE. The at least one second account information may include an identifier of a social network service. According to some embodiments, the wireless network access request signal may further include at least one of device information (e.g., a MAC address, a model name, a Subscriber Identity Module (SIM) information, a phone number, an International Mobile Equipment Identity (IMEI), etc.) of the second electronic device 200.

In operation 207, the first electronic device 100 according to an embodiment of the disclosure may transmit a response signal (e.g., a probe response signal) for the wireless network access request signal to the second electronic device 200. The probe response signal may include the at least one first account information (e.g., the identifier of the social network service). For example, the probe response signal may include the at least one first account information in the VSIE.

In operation 209, the first electronic device 100 according to an embodiment of the disclosure may compare the received first account information and second account information to identify at least one matched account information. Similarly, in operation 211, the second electronic device 200 according to an embodiment of the disclosure may compare the first account information and the second account information to identify at least one matched account information. For example, the first electronic device 100 and the second electronic device 200 may extract at least one account information having the same service or site identifier (e.g., a name or an address (URL)) included in the first account information and second account information.

In operation 213, the first electronic device 100 and second electronic device 200 according to an embodiment of the disclosure may determine one of the at least one matched account information. For example, the first electronic device 100 and the second electronic device 200 may use a Generic Advertisement Service (GAS) protocol to determine one of the at least one matched account information. Specifically, when one of the pieces of matched account information is selected by a user, the second electronic device 200 may transmit a GAS initial request signal for a query regarding whether to use the selected account information to the first electronic device 100, and may transmit a GAS initial response signal for the query to the second electronic device 200.

In operation 215, the first electronic device 100 and second electronic device 200 according to an embodiment of the disclosure may perform a first authentication procedure. For example, the second electronic device 200 may transmit a first authentication request signal to the first electronic device 100, and may receive a first authentication response signal from the first electronic device 100. The operation 215 may be an operation for identifying whether the first electronic device 100 is in a state of being connectable to another electronic device.

If it is identified in operation 215 that the devices are authenticated (e.g., if it is identified as a state in which the devices are mutually accessible), in operation 217, the second electronic device 200 according to an embodiment of the disclosure may request the social service server 300-1 determined in operation 213 to transmit a temporary account verify key. For example, if the determined account information is Facebook™, the second electronic device 200 may request a Facebook server to transmit the temporary account verify key. The second electronic device 200 may request the Facebook server to transmit the temporary account verify key via a mobile communication network.

In operation 219, the social service server 300-1 according to an embodiment of the disclosure may transmit a response signal for the temporary account verify key request to the second electronic device 200. The response signal may include the temporary account verify key.

According to some embodiments, the operations 217 and 219 may be omitted when the first electronic device 100 logs in to the social service server 300-1 by using an account ID, an account password, or an access token to identify relation information in operation 221 to 227 described below.

In operation 221, the second electronic device 200 according to an embodiment of the disclosure may transmit an association request signal to the first electronic device 100. The association request signal may include second user account information. According to various embodiments, the association request signal may include account information corresponding to the account information determined in operation 213. For example, the account information may include at least one of a second user account ID, an account password, and a temporary account verify key received in operation 219, and an access token.

In operation 223, the first electronic device 100 according to an embodiment of the disclosure may request the social service server 300-1 to transmit data (e.g., a friend list) including the relation information. For example, the first electronic device 100 may transmit first account information to a social service server corresponding to the account information determined in operation 213, and may request for data (e.g., a friend list) including relation information of the first account information. For example, the first electronic device 100 may request the social service server (e.g., Facebook) to transmit the friend list by using a code as shown in Table 1 below.

TABLE 1

```
new GraphRequest (
    AccessToken.getCurrentAccessToken ( ),
    "/{group-id}/members",
    null,
    HttpMethod.GET,
    new GraphRequest.Callback( ) {
        public void onCompleted(GraphResponse response) {
            /* handle the result */
        }
    }
).executeAsync ( );
```

According to some embodiments, the first electronic device 100 may transmit to the social service server 300-1 a query for inquiring whether the second user ID is included in the relation information (e.g., the friend list) of the first account information. For example, upon transmitting the query to the Facebook, the first electronic device 100 may use a code as shown in Table 2 below.

TABLE 2

```
new GraphRequest(
    AccessToken.getCurrentAccessToken( ),
    "/{user-id}/friends",
    null,
    HttpMethod.GET,
    new GraphRequest.Callback( ) {
        public void onCompleted(GraphResponse response) {
            /* handle the result */
        }
    }
).executeAsync( );
```

In operation 225, the social service server 300-1 according to an embodiment of the disclosure may transmit the requested data (e.g., the friend list) to the first electronic device 100. For example, the data may include an indication indicating that the second user ID is linked to the first user ID. According to some embodiments, the social service server 300-1 may transmit a response for the relation information query to the first electronic device 100.

In operation 227, the first electronic device 100 according to an embodiment of the disclosure may identify the relation. For example, the first electronic device 100 may check whether the second user ID exists in the data (e.g., the friend list) including the received relation information. According to some embodiments, the first electronic device 100 may identify a response result for the relation information query.

In operation 229, the first electronic device 100 according to an embodiment of the disclosure may transmit an association response signal depending on the identification result of operation 227 to the second electronic device 200. For example, if the check result shows that the second user ID exists in the relation information of the first electronic device 100 or if a response indicating that the second user ID exits in the relation information of the first electronic device 100 is received, the association response signal may indicate that an access is granted. Otherwise, if the check result shows that the second user ID does not exist in the relation information of the first electronic device 100 or if a response indicating that the second user ID does not exist in the relation information of the first electronic device 100 is received, the association response signal may indicate that an access is not granted.

In response to reception of the association response signal indicating that the access is granted, in operation 231, the first electronic device 100 and the second electronic device 200 may perform a second authentication procedure. For example, the second authentication procedure may be an 802.1x authentication procedure which requires encryption. The 802.1x authentication procedure is a well-known technique in WiFi communication, and thus detailed descriptions thereof will be omitted. For example, the first electronic device 100 may manage account information and a temporary account verify key by using a DB to perform the 802.1x procedure. In this case, the first electronic device 100 may serve as an Authentication, Authorization, Accounting (AAA) server.

According to some embodiments, the second authentication procedure may be an Extensible Authentication Protocol (EAP) authentication. According to another embodiment, the second authentication procedure may be an authentication procedure of a Wired Equivalent Privacy (WEP) or WiFi Protected Access-Pre-Shared Key (WPA-PSK) type using a predetermined encryption key. Herein, the first electronic device 100 may use the temporary account verify key issued through operations 217 to 221 as the encryption key.

If the second authentication procedure is complete, for example, if it is authenticated that the access of the second electronic device 200 is available, in operation 233, the first electronic device 200 may grant the access of the second electronic device 200. When the access is granted, the second electronic device 200 may use the Internet via the first electronic device 100.

Figure 3:
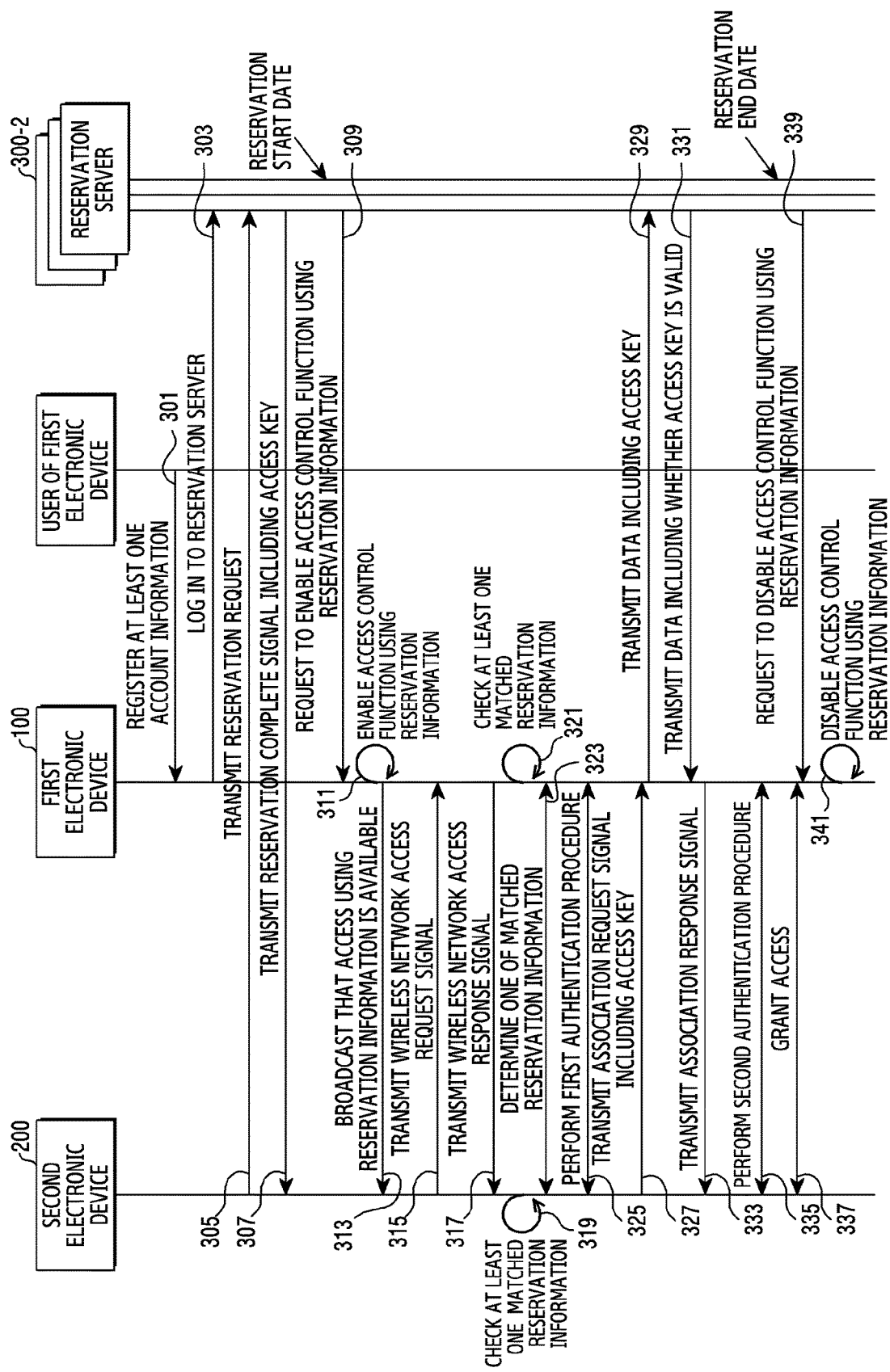
FIG. 3 is a flowchart illustrating a procedure in which a wireless communication system controls a wireless communication connection by using reservation information according to an embodiment of the disclosure.

FIG. 3 is a flowchart illustrating a procedure in which a wireless communication system controls a wireless communication connection by using reservation information according to an embodiment of the disclosure.

Referring to FIG. 3, in operation 301, a user (or an administrator) of the first electronic device 100 of a wireless communication system according to an embodiment of the disclosure may register at least one account information to the first electronic device 100. For example, the account information may include an identifier (e.g., a name or an address) of at least one reservation site which provides a reservation service of a hotel, a restaurant, a theater, a concert hall, or the like, and an ID or password of an administrator account which can be used for login.

In response to the registration of the account information, in operation 303, the first electronic device 100 may log in to a reservation server 300-2. In this case, the first electronic device 100 may notify to the reservation server 300-2 that the wireless communication connection can be controlled by using reservation information.

In operation 305, the second electronic device 200 may transmit a reservation request to the reservation server 300-2.

Upon completion of the reservation, in operation 307, the reservation server 300-2 may transmit a reservation complete message including an access key to the second electronic device 200. The reservation complete message may include reservation information. The reservation information may include an identifier (e.g., a name or an address) of the reservation server 300-2.

When it is a reservation start date (or a reservation time) on the basis of the reservation information, in operation 309, the reservation server 300-2 may transmit an enable request of an access function of wireless communication using the reservation information (hereinafter, an access control function based on the reservation information) to the first electronic device 100. The enable request may include the reservation information.

In operation 311, the first electronic device 100 which has received the enable request may enable an access control function based on the reservation information.

In operation 313, the first electronic device 100 may broadcast that an access of wireless communication is granted (or grantable) based on the reservation information. For example, the first electronic device 100 may generate and broadcast a beacon signal including an indicator indicating that the access of the wireless communication is granted (or grantable) by using the reservation information. The beacon signal may include the indicator in a VSIE of the beacon frame.

According to some embodiments, the first electronic device 100 may generate and broadcast the beacon signal including the indicator indicating that the access of the wireless communication is granted (or grantable) by using reservation information of a specific reservation server which has transmitted the enable request among the reservation servers 300-2.

Upon receiving the broadcasting beacon signal, in operation 315, the second electronic device 200 may transmit a wireless network access request signal to the first electronic device 100. The wireless network access request signal may include at least one reservation information. The at least one reservation information may include an identifier (e.g., a name or an address) of a reservation server.

According to some embodiments, the second electronic device 200 may extract and transmit proper reservation information by considering a corresponding date, time, and position among a plurality of pieces of stored reservation information. According to some embodiments, the wireless network access request signal may include the reservation information of the specific reservation server.

In operation 317, the first electronic device 100 which has received the wireless network access request signal may transmit the wireless network access response signal to the second electronic device 200. The wireless network access response signal may include reservation information (e.g., an identifier of the reservation server 300-2) corresponding to at least one account information registered in operation 301.

In operation 319, the second electronic device 200 according to an embodiment of the disclosure may identify at least one matched reservation information. Similarly, in operation 321, the first electronic device 100 according to an embodiment of the disclosure may identify the at least one matched reservation information.

In operation 323, the first electronic device 100 and second electronic device 200 according to an embodiment of the disclosure may determine one of the at least one matched reservation information. For example, the first electronic device 100 and the second electronic device 200 may use a GAS protocol to determine one of the at least one matched reservation information.

In operation 325, the first electronic device 100 and second electronic device 200 according to an embodiment of the disclosure may perform a first authentication procedure. The first authentication procedure may be similar to the operation 215 of FIG. 2. Therefore, detailed descriptions thereof will be omitted.

If it is authenticated through the first authentication procedure that the connection is available, in operation 327, the second electronic device 200 according to an embodiment of the disclosure may transmit an association request signal including an access key received in operation 307 to the first electronic device 100.

In operation 329, the first electronic device 100 according to an embodiment of the disclosure may transmit data including an access key to the reservation server 300-2. In operation 331, the reservation server 300-2 according to an embodiment of the disclosure may transmit data indicating whether the access key is valid. For example, the first electronic device 100 may identify whether the received access key is valid, and may transmit to the first electronic device 100 a response signal including the data indicating whether the access key is valid.

In operation 333, the first electronic device 100 according to an embodiment of the disclosure may transmit to the second electronic device 200 an association response signal regarding whether the access is granted.

In response to reception of the response signal indicating whether the access is granted, in operation 335, the first electronic device 100 and the second electronic device 200 may perform a second authentication procedure. The second authentication procedure may be similar to the operation 231 of FIG. 2. Therefore, detailed descriptions thereof will be omitted.

If the second authentication procedure is complete, for example, if it is authenticated that the access of the second electronic device 200 is available, in operation 337, the first electronic device 200 may grant the wireless network access of the second electronic device 200 so that the second electronic device 200 can use the Internet.

In operation 339, if a reservation date is over, the reservation server 300-2 according to an embodiment of the disclosure may transmit to the first electronic device 100 a disable request signal of an access control function based on reservation information. In response to reception of the disable request signal, in operation 341, the first electronic device 100 may disable the access control function based on the reservation information.

The first electronic device 100 according to an embodiment of the disclosure may grant the wireless communication access of the second electronic device 200 only during a reservation period. According to an embodiment of the disclosure, a resource of the first electronic device 100 can be effectively managed.

Meanwhile, it is described above that the reservation server 300-2 controls whether to enable/disable the access control function based on the reservation information of the first electronic device 100 on the basis of the reservation information. However, according to another embodiment, the first electronic device 100 may receive and store the reservation information from the reservation server 300-2, and may control whether to disable/enable the access control function based on the reservation information, based at least in part (e.g., a reservation date and time) on the reservation information.

Figure 4:
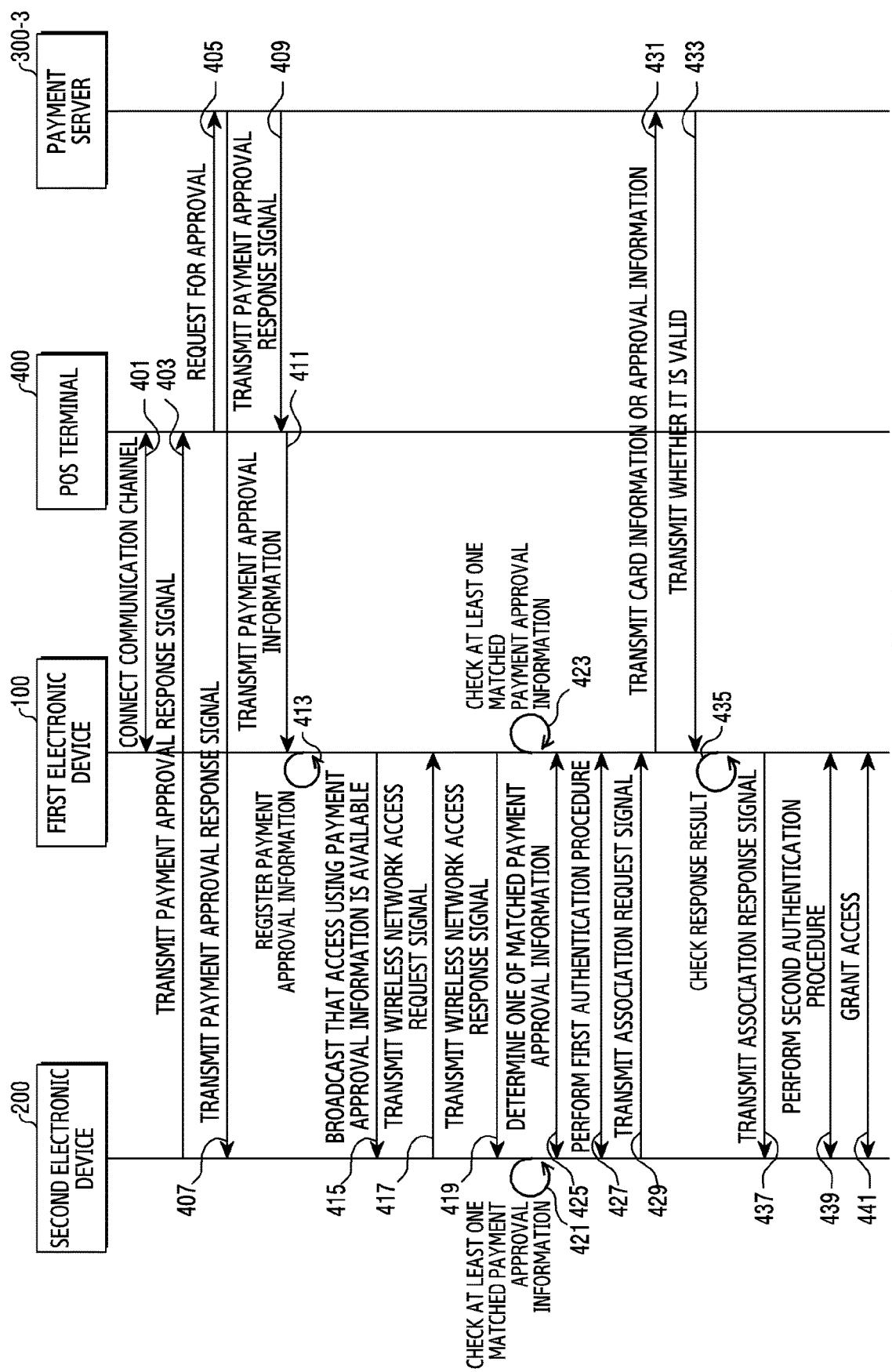
FIG. 4 is a flowchart illustrating a procedure in which a wireless communication system controls a wireless communication connection by using payment information according to an embodiment of the disclosure.

FIG. 4 is a flowchart illustrating a procedure in which a wireless communication system controls a wireless communication connection by using payment information according to an embodiment of the disclosure.

Referring to FIG. 4, in operation 401, the first electronic device 100 of a wireless communication system according to an embodiment of the disclosure may connect a communication channel with a Point of sales (POS) terminal 400. For example, the first electronic device 100 may be coupled to the POS terminal 400 in a wired or wireless (BLE, WiFi, etc.) manner.

In operation 403, the second electronic device 200 may transmit a payment request to the POS terminal 400. The payment request may include card information. The card information may include at least one of a card number, an expiration date, or an encrypted card number. In operation 405, the POS terminal 400 may transmit an approval request to a payment server 300-3.

In operation 407, the payment server 300-3 may transmit a response signal (a payment approval response signal) for approving a payment to the second electronic device 200./ In addition, in operation 409, the payment server 300-3 may transmit a response signal (a payment approval response signal) for approving a payment to the POS terminal 400. The payment approval response signals may include an approval number.

Upon receiving the payment approval response signal, in operation 411, the POS terminal 400 may transmit payment approval information to the first electronic device 100. The payment approval information may include card information and approval information. The card information may include at least one of a card number, an expiration date, and an encrypted card number. The approval information may include at least one of an approval number and an approval date and time.

In operation 413, the first electronic device 100 may register payment approval information. For example, the first electronic device 100 may store the payment approval information in a memory.

In operation 415, the first electronic device 100 may broadcast that an access of wireless communication is granted (or grantable) based on payment information. For example, the first electronic device 100 may generate and broadcast a beacon signal including an indicator indicating that the access of the wireless communication is granted (or grantable) by using the payment information. The beacon signal may include the indicator in a VSIE.

Upon receiving the broadcasting beacon signal, in operation 417, the second electronic device 200 may transmit a wireless network access request signal to the first electronic device 100. The wireless network access request signal may include at least one payment approval information. The at least one payment approval information may include card information or approval information.

In operation 419, the first electronic device 100 which has received the wireless network access request signal may transmit the wireless network access response signal to the second electronic device 200. The wireless network access response signal may include card information or approval information received in operation 411.

In operation 421, the second electronic device 200 according to an embodiment of the disclosure may identify at least one matched payment approval information. For example, the second electronic device 200 may compare the stored payment approval information with payment approval information included in the response signal to identify the at least one matched payment approval information. Similarly, in operation 423, the first electronic device 100 according to an embodiment of the disclosure may identify at least one matched payment approval information. For example, the first electronic device 100 may compare the payment approval information registered (or stored) through operation 413 and the payment approval information received in operation 417 to identify at least one matched payment approval information.

In operation 425, the first electronic device 100 and second electronic device 200 according to an embodiment of the disclosure may determine (select) one of the at least one matched payment approval information. For example, the first electronic device 100 and the second electronic device 200 may use a GAS protocol to determine one of the at least one matched payment approval information.

In operation 427, the first electronic device 100 and second electronic device 200 according to an embodiment of the disclosure may perform a first authentication procedure. The first authentication procedure may be similar to the operation 215 of FIG. 2. Therefore, detailed descriptions thereof will be omitted.

If it is authenticated through the first authentication procedure that the connection is available, in operation 429, the second electronic device 200 according to an embodiment of the disclosure may transmit an association request signal to the first electronic device 100. The association request signal may include at least one of approval information and card information corresponding to the determined payment approval information.

In operation 431, the first electronic device 100 according to an embodiment of the disclosure may transmit at least one of card information and approval information to the payment server 300-3. In operation 433, the payment server 300-3 according to an embodiment of the disclosure may identify whether the received card information or approval information is valid, and may transmit to the first electronic device 100 a response signal indicating whether it is valid.

In operation 435, the first electronic device 100 according to an embodiment of the disclosure may check a response result. In operation 437, the first electronic device 100 according to an embodiment of the disclosure may transmit to the second electronic device 200 an association response signal corresponding to the check result.

In response to the response signal indicating whether the access is granted, in operation 439, the first electronic device 100 and the second electronic device 200 may perform a second authentication procedure. The second authentication procedure may be similar to operation 231 of FIG. 2. Therefore, detailed descriptions thereof will be omitted.

If the second authentication procedure is complete, for example, if it is authenticated that the access of the second electronic device 200 is available, in operation 441, the first electronic device 200 may grant the wireless network access of the second electronic device 200 so that the second electronic device 200 can use the Internet.

According to some embodiments, operations 431 and 433 may be omitted. For example, the first electronic device 100 may compare the payment approval information stored in operation 413 with the payment approval information received in operation 429 to identify whether it is valid.

According to some embodiments, similarly to FIG. 4, the first electronic device may grant the access of the second electronic device 200 during a specific date (e.g., a payment date) or a specific time (e.g., 1 hour) with respect to an approval date and time.

Figure 5:
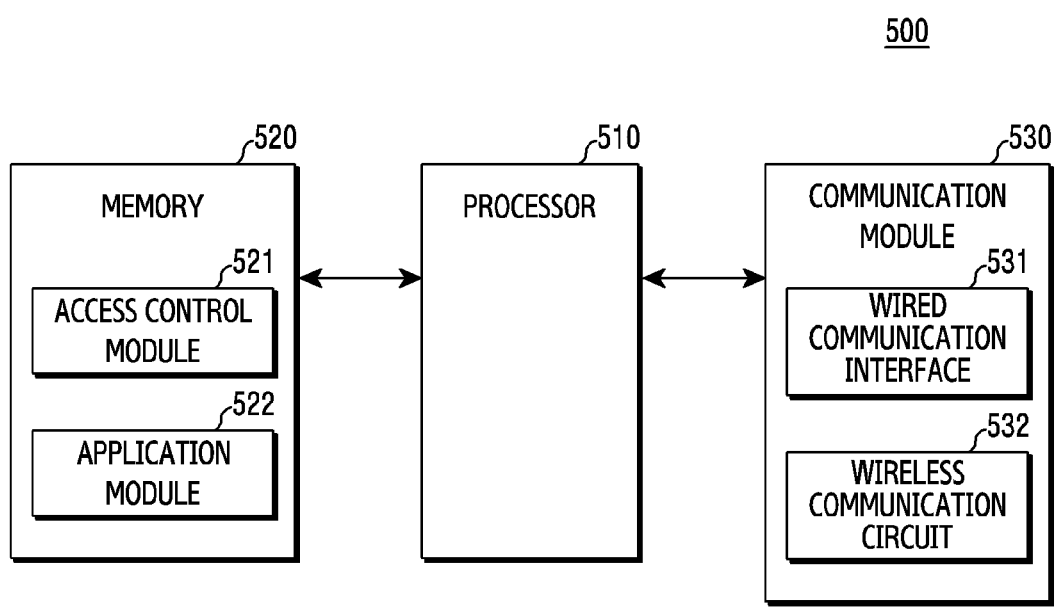
FIG. 5 is a block diagram illustrating a structure of an electronic device according to an embodiment of the disclosure.

FIG. 5 is a block diagram illustrating a structure of an electronic device according to an embodiment of the disclosure.

Referring to FIG. 5, an electronic device 500 according to an embodiment of the disclosure may be the first electronic device 100 of FIG. 1 to FIG. 4.

The electronic device 500 according to an embodiment of the disclosure may include a processor 510, a memory 520, and a communication module 530. For example, the processor 510, the memory 520, the communication module 530 may be included in an access point included in a housing which constitutes an exterior of the electronic device 500 to protect internal components.

The processor 510 may control an overall operation of the electronic device 500. For example, the processor 510 may control each of components of the electronic device 500. The processor 510 may receive instructions from the memory 520, and may perform various functions by controlling each of components according to the received instructions. The processor 510 may be a Central Processing Unit (CPU), an Application Processor (AP), a Micro Control Unit (MCU), a Micro Processor Unit (MPU), or the like. The processor 510 may be a single-core processor or a multi-core processor. In another embodiment, the processor 510 may be a multi-processor consisting of a plurality of processors. For example, the processor 510 may include an Application Processor (AP) and a Communication Processor (CP). In another embodiment, the processor 510 may include a high-power processor (e.g., AP) and a low-power processor (e.g., MCU, MPU), The processor 510 according to various embodiments of the disclosure may control a wireless communication connection using authentication association information (e.g., account information, reservation information, payment information) on the basis of commands and/or instructions stored in the memory 520. Detailed descriptions thereof will be described below with reference to accompanying drawings.

The memory 520 may store various programs for operating the electronic device 500, and may store data generated or downloaded during the various programs are executed. In addition, the memory 520 may store various commands and/or instructions for operating the processor 510. The memory 520 may include at least any one of an internal memory and an external memory.

According to various embodiments, the memory 520 may include an access control module 521 and an application module 522 to control a wireless communication connection by using authentication association information (e.g., account information, reservation information, and payment information). The access control module 521 and application module 522 according to various embodiments may imply a code or set of instructions to be stored in the memory 520. The access control module 521 may manage and control whether an access is granted for an electronic device (e.g., the second electronic device 200 of FIG. 1 to FIG. 4) which attempts an access to the electronic device 500. For example, the access control module 521 may manage a list of credential information. Herein, the credential information may be credential information itself (e.g., a password), or may be different information associated with credentials, for example, credential issuing server information and credential service server information. The credential information according to an embodiment of the disclosure may include authentication association information (e.g., password information, reservation information, payment information) capable of identifying a relation between users of electronic devices, other than information used for authentication in the conventional wireless network.

The access control module 521 may broadcast a beacon signal including an indicator indicating that an access is available using credential information via the communication module 530. The access control module 521 according to an embodiment of the disclosure may generate a beacon signal, which includes an indicator indicating that an access is available using authentication association information (e.g., account information, reservation information, payment information), in a VSIE to broadcast it via the communication module 530.

The access control module 521 may receive credential information of an electronic device (e.g., the second electronic device 200) which requests for a wireless network access via the communication module 530. According to some embodiments, the access control module 521 may receive device information of a corresponding electronic device together with the credential information. The device information of the corresponding electronic device is unique information, and may include, for example, at least one of a MAC address, a manufacture's serial number, SIM card information, and IMEI information.

The access control module 521 may use the received credential information to identify user account information and a service server used by the user of the electronic device. The access control module 521 may transfer the identified service server and user account information to the application module 522. According to some embodiments, the access control module 521 may transfer device information to the application module 522 together with the credential information.

As an interface for accessing an external service server (e.g., a social service server, a reservation server, a payment server, etc.), the application module 522 may be implemented using an Application Programming Interface (API) provided by the external service server. For example, the application module 522 may log in with an administrator account of the electronic device 500 according to information (e.g., a site address) of a service providing server, received from the access control module 521. According to some embodiments, the application module 522 may be in a state of logging in to an external service registered by an administrator with the administrator account of the electronic device 500.

The application module 522 may transmit to a specific service server (e.g., Facebook) at least part of credential information received from the access control module 521 and thus may identify a relation (e.g., a friend, a subscriber, a buyer) between a user of an electronic device (e.g., the second electronic device 200) which has requested for the access to the electronic device 500 and an administrator of the electronic device 500.

The communication module 530 may perform wired communication and wireless communication. For example, the communication module 530 may include a wired communication interface 531 and a wireless communication circuit 532.

The wired communication interface 531 may be an interface to be coupled to the Internet. The wired communication interface 531 may serve to transmit/receive a message by coupling the application module 522 and a server (e.g., the server 300 of FIG. 1).

The wired communication interface 531 according to an embodiment of the disclosure may exchange data with the server to determine whether second authentication association information is related to the first authentication association information. For example, the wired communication interface 531 may transmit first account information to a server (e.g., the social service server 300-1 of FIG. 2) and receive a friend list. According to some embodiments, the wired communication interface 531 may transmit to the server a query for inquiring whether a user is a friend. For another example, the wired communication interface 531 may transmit an access key to the server (e.g., the reservation server 300-2 of FIG. 3) and receive whether the access key is valid. For another example, the wired communication interface 531 may transmit card information or approval information to a payment server (e.g., the payment server 300-3 of FIG. 4) and receive whether the card information or the approval information is valid.

The wireless communication circuit 532 may perform wireless communication between the electronic device 500 and an electronic device (e.g., the second electronic device 200) which has requested for a wireless network access. For example, the wired communication circuit 532 may serve to transmit/receive a message with respect to the electronic device which has requested for the wireless network access. The wireless communication circuit 532 may support various protocols for short-range wireless communication (e.g., WiFi, BLE, Bluetooth, etc.).

The wireless communication circuit 532 according to an embodiment of the disclosure may broadcast a beacon signal including an indicator indicating that a wireless network access using relation information is granted (or grantable). The wired communication circuit 532 may receive a wireless network access request signal including at least one account information (e.g., second account information) from neighboring electronic devices (e.g., the second electronic device 200).

The wireless communication circuit 532 according to an embodiment of the disclosure may transmit whether the access is granted based on an authentication result depending on authentication association information to an electronic device (e.g., the second electronic device 200) which has requested for the access.

According to some embodiments, the wireless communication circuit 532 may be an interface to be coupled to the Internet. Alternatively, the wireless communication circuit 532 may be coupled to another electronic device (e.g., a wireless router) including the interface to be coupled to the Internet.

An electronic device (e.g., the first electronic device 100 of FIG. 1 and FIG. 2, the electronic device 500 of FIG. 5) according to various embodiments of the disclosure may include: a housing; and an access point inside the housing. The access point may include: a wired communication interface (e.g., the wired communication interface 531 of FIG. 5) configured to be coupled to the Internet; a wireless communication circuit (e.g., the wireless communication circuit 532 of FIG. 5) configured to support a WiFi protocol; a processor (e.g., the processor 510 of FIG. 5) operatively coupled to the wired communication interface and the wireless communication circuit; and a memory (e.g., the memory 520 of FIG. 5) operatively coupled to the processor. The memory may store instructions, when executed, for allowing the processor to: receive at least one first account information stored in at least one server (e.g., the server 300 of FIG. 1, the social service server 300-1 of FIG. 2) from a first electronic device via the wireless communication circuit; store the first account information in the memory; broadcast a beacon signal including an indicator indicating that a WiFi access is granted based at least in part on account information related to the server via the wireless communication circuit; receive at least one second account information from a second electronic device (e.g., the second electronic device 200 of FIG. 1 and FIG. 2) via the wireless communication circuit; determine whether the second account information is related to the first account information, based at least in part on data to be exchanged with the server via the wired communication interface; and upon determining that the second account information is related to the first account information, grant the second electronic device an access to the access point in order to use the Internet, without having to request for credential information from the second electronic device.

According to various embodiments, the beacon signal may include a Vender-Specific Information Element (VSIE) including the indicator.

According to various embodiments, the first account information may include a first user IDentifier (ID), and the second account information may include a second user ID.

According to various embodiments, the instructions may allow the processor to exchange the data with the server by using an Application Programming Interface (API) associated with the server.

According to various embodiments, the data may include an indication which indicates that the second user ID is linked with the first user ID.

According to various embodiment, the instruction for determining whether the second account information is related to the first account information may allow the processor to determine at least one matched account information if the number of the first account information and/or the second account information is plural, and to determine whether the second account information is related to the first account information by using the determined at least one matched account information.

According to various embodiments, the first account information and the second account information may include a server identifier for identifying a server, and the matched account information may include the same server identifier.

According to various embodiments, the instruction for determining whether the second account information is related to the first account information may allow the processor to receive a temporary account verify key from the second electronic device via the wireless communication circuit, and to determine whether the second account information is related to the first account information by requesting the server to authenticate the temporary account verify key.

An electronic device (e.g., the first electronic device 100 of FIG. 1 and FIG. 3, the electronic device 500 of FIG. 5) according to various embodiments of the disclosure may include: a housing; and an access point inside the housing. The access point may include: a wired communication interface (e.g., the wired communication interface 531 of FIG. 5) configured to be coupled to the Internet; a wireless communication circuit (e.g., the wireless communication circuit 532) configured to support a WiFi protocol; a processor (e.g., the processor 510 of FIG. 5) operatively coupled to the wired communication interface and the wireless communication circuit; and a memory (e.g., the memory 520 of FIG. 5) operatively coupled to the processor. The memory may store instructions, when executed, for allowing the processor to: receive at least one account information related to at least one reservation server (e.g., the server 300 of FIG. 1, the reservation server 300-2 of FIG. 3) from a first electronic device via the wireless communication circuit; log in to the reservation server by using the at least one account information; receive an enable request, including at least one first reservation information, for a function which grants a WiFi access, based at least in part on reservation information, from the reservation server; store the first reservation in formation in the memory; after enabling the function, broadcast a beacon signal including an indicator indicating that a WiFi access is granted based at least in part on reservation information via the wireless communication circuit; receive at least one second reservation information from a second electronic device (e.g., the second electronic device 200 of FIG. 1 and FIG. 3) via the wireless communication circuit; determine whether the second reservation information is related to the first reservation information, based at least in part on data to be exchanged with the reservation server via the wired communication interface; and upon determining that the second reservation information is related to the first reservation information, grant the second electronic device an access to the access point in order to use the Internet, without having to request for credential information from the second electronic device.

According to various embodiments, the memory may further store an instruction for allowing the processor to block an access of the second electronic device upon receiving a block request of the access from the reservation server via the wired communication interface.

An electronic device (e.g., the first electronic device 100 of FIG. 1 and FIG. 4, the electronic device 500 of FIG. 5) according to various embodiments of the disclosure may include: a housing; and an access point inside the housing. The access point may include: a wired communication interface (e.g., the wired communication interface 531 of FIG. 5) configured to be coupled to the Internet; a wireless communication circuit (e.g., the wireless communication circuit 532 of A FIG. 5) configured to support a WiFi protocol; a processor (e.g., the processor 510 of FIG. 5) operatively coupled to the wired communication interface and the wireless communication circuit; and a memory (e.g., the memory 520 of FIG. 5) operatively coupled to the processor. The memory may store instructions, when executed, for allowing the processor to: connect a communication channel with a first electronic device (e.g., the POS terminal 400 of FIG. 4) coupled with a payment server (e.g., the server 300 of FIG. 1, the payment server 300-3 of FIG. 4) via the wireless communication circuit; receive at least one first payment approval information from the first electronic device; store the first payment approval information in the memory; broadcast a beacon signal including an indicator indicating that a WiFi access is granted based at least in part on payment approval information via the wireless communication circuit; receive at least one second payment approval information from a second electronic device (e.g., the second electronic device 200 of FIG. 1 and FIG. 4) via the wireless communication circuit; determine whether the second payment approval information is related to the first payment approval information, and upon determining that the second account information is related to the first account information, grant the second electronic device an access to the access point in order to use the Internet, without having to request for credential information from the second electronic device.

According to various embodiments, the instruction for determining whether the second payment approval information is related to the first payment approval information may determine whether the second payment approval information is related to the first payment approval information, based at least in part on data to be exchanged with the payment server via the wired communication interface.

According to various embodiments, the first payment approval information and the second payment approval information may include a payment approval date and time. The instruction for granting the second electronic device the access to the access point may allow the processor to grant the second electronic device the access to the access point during a designated period, based at least in part on the payment approval date and time.

Figure 6:
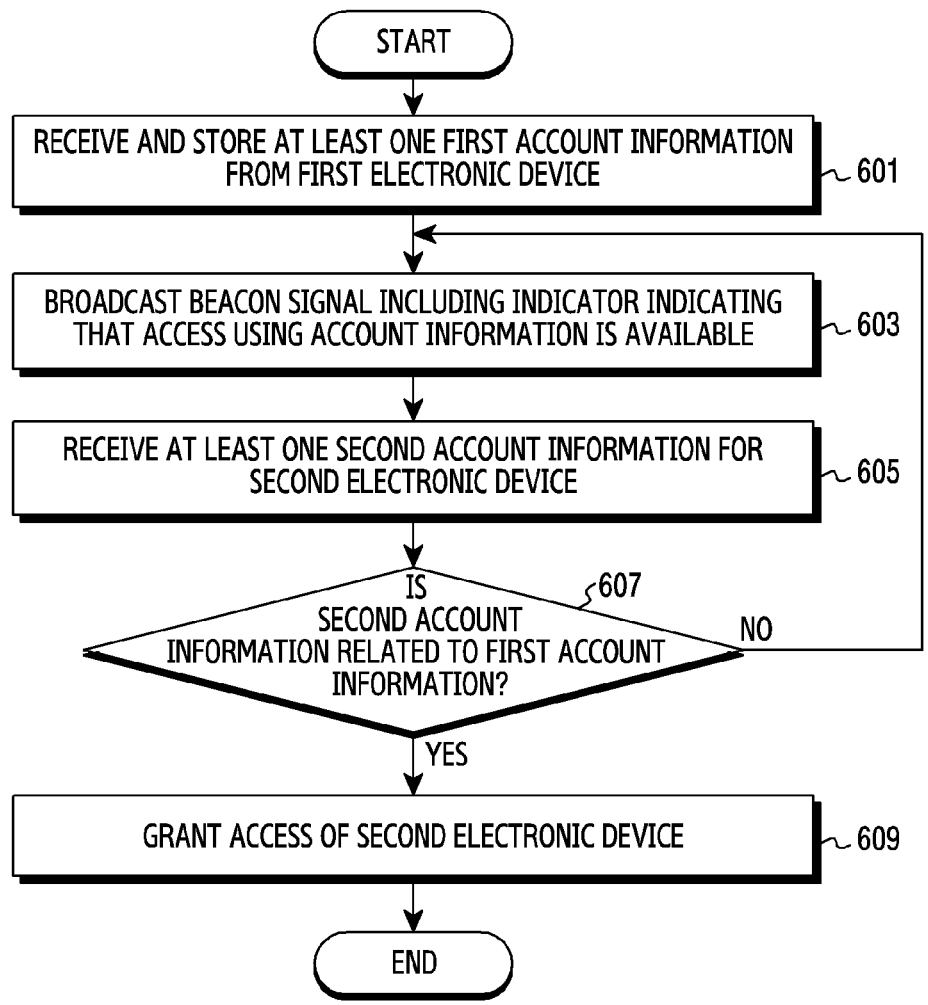
FIG. 6 is a flowchart illustrating a wireless communication control procedure of an electronic device using account information according to an embodiment of the disclosure.

FIG. 6 is a flowchart illustrating a wireless communication control procedure of an electronic device using account information according to an embodiment of the disclosure.

Referring to FIG. 6, in operation 601, a processor (e.g., the processor 510 of FIG. 5) of an electronic device (e.g., the first electronic device 100 of FIG. 1 and FIG. 2, the electronic device 500 of FIG. 5) according to an embodiment of the disclosure may receive and store at least one account information (hereinafter, first account information) from a first electronic device (a different electronic device of an administrator of the electronic device). For example, the processor may receive at least one first account information via a wireless communication circuit (e.g., the wireless communication circuit 532 of FIG. 5) supporting a WiFi protocol. According to some embodiments, the processor may receive the at least one first account information from a different electronic device (e.g., a PC, a notebook, etc.) coupled with the electronic device via a wired communication interface. The first account information may include at least one of an identifier of a server (e.g., the social service server 300-1 of FIG. 2), a user ID, a password, an access token, and a temporary account verify key.

In operation 603, the processor according to various embodiments of the disclosure may broadcast a beacon signal including an indicator indicating that an access using account information is granted (or grantable). For example, the processor may broadcast the beacon signal via a wireless communication circuit. The beacon signal may include the indicator in a VSIE.

In operation 605, the processor according to various embodiments of the disclosure may receive at least one second account information from a second electronic device (e.g., the second electronic device 200 of FIG. 1 and FIG. 2). For example, the processor may receive the at least one second account information via the wireless communication circuit.

In operation 607, the processor according to various embodiments of the disclosure may determine whether the second account information is related to the first account information. For example, the processor may determine whether the second account information is related to the first account information, based at least in part on data to be exchanged with a server via the wired communication interface (e.g., the wired communication interface 531 of FIG. 5). Herein, the method of determining whether being related to each other is similar to FIG. 2, and thus detailed descriptions thereof will be omitted.

If it is identified in operation 607 that there is no relation, returning to operation 603, the processor according to various embodiments of the disclosure may repeat the aforementioned operations. Otherwise, if it is identified in operation 607 that there is a relation, in operation 609, the processor according to various embodiments of the disclosure may grant an access of the second electronic device. For example, if the data includes an indication indicating that the second user ID is linked to the first user ID, the processor may grant the second electronic device an access to an access point included in the electronic device in order to use the Internet, instead of requesting for credential information from the second electronic device.

Meanwhile, although not shown in FIG. 6, if the number of pieces of the first account information and/or the second account information is plural, an operation may be further included in which the processor according to various embodiments of the disclosure extracts (or detect) at least one matched account information, and determines (selects) one of the at least one matched account information.

Figure 7:
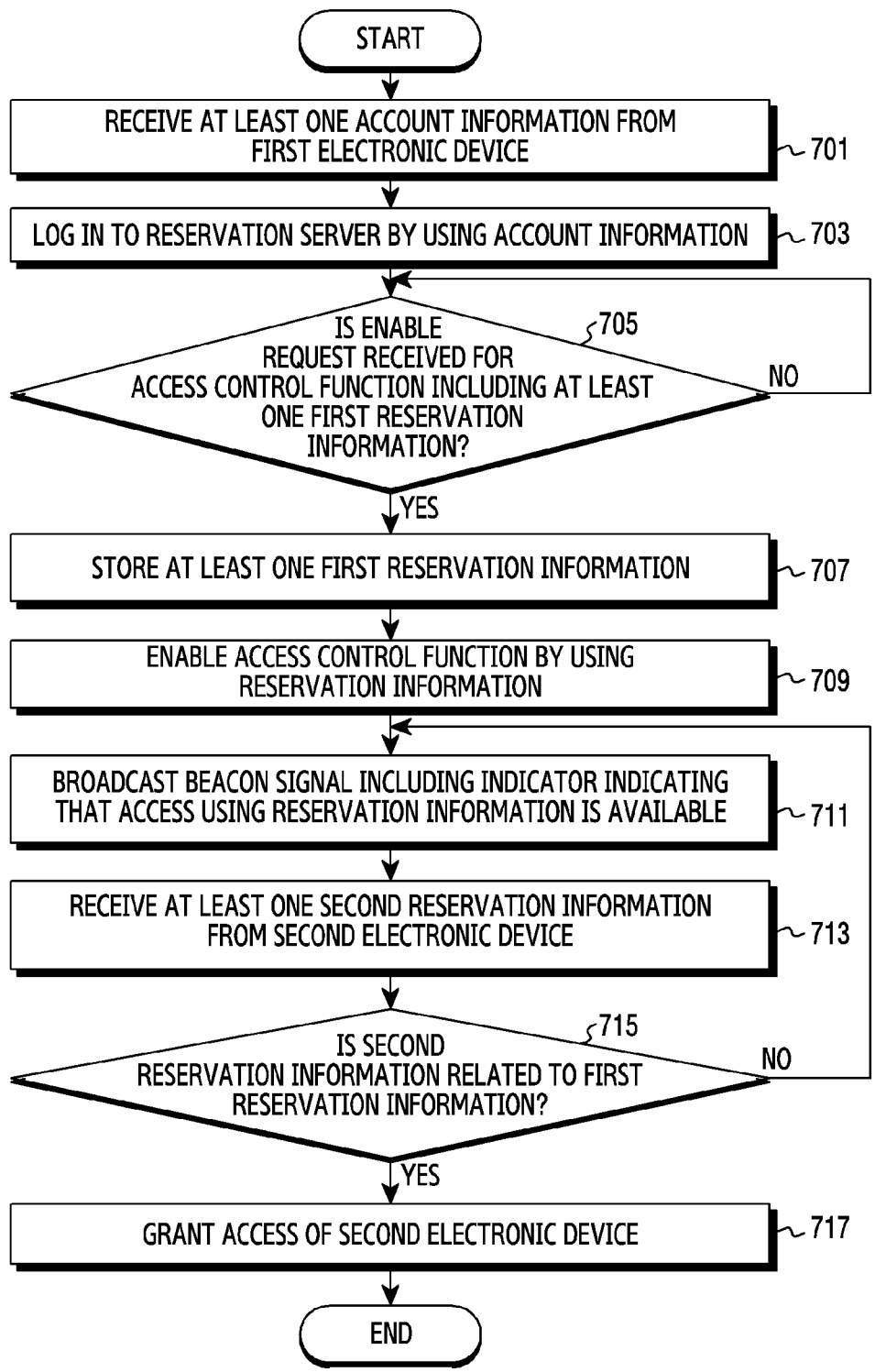
FIG. 7 is a flowchart illustrating a wireless communication control procedure of an electronic device using reservation information according to an embodiment of the disclosure.

FIG. 7 is a flowchart illustrating a wireless communication control procedure of an electronic device using reservation information according to an embodiment of the disclosure.

Referring to FIG. 7, in operation 701, a processor (e.g., the processor 510 of FIG. 5) of an electronic device according to an embodiment of the disclosure (e.g., the first electronic device 100 of FIG. 1 and FIG. 3, the electronic device 500 of FIG. 5) may receive at least one account information from a first electronic device (e.g., another electronic device (e.g., a smart phone, a tablet PC, etc.) of a user (or an administrator) of the electronic device. For example, the processor may receive the at least one account information from another electronic device (e.g., a PC, a notebook, etc.) coupled with the electronic device via a wired communication interface (e.g., the wired communication interface 531 of FIG. 5). The received at least one account information may be stored in a memory (e.g., the memory 520 of FIG. 5). The account information may include an identifier (e.g., a name or an address) of a reservation server (e.g., the reservation server 300-2 of FIG. 3) and account information of a user (administrator) of an electronic device.

In operation 703, the processor according to various embodiments of the disclosure may log in to the reservation server by using the received at least one account information.

In step 705, the processor according to various embodiments of the disclosure may identify whether an enable request of an access control function is received to control whether a wireless network access is achieved using the reservation information. The enable request may be generated in the reservation server on a reservation start date, and may include at least one first reservation information.

If it is identified in operation 705 that the enable request is not received, the processor according to various embodiments of the disclosure may maintain operation 705. Otherwise, if it is identified in operation 705 that the enable request is received, in operation 707, the processor according to various embodiments of the disclosure may store at least one first reservation information.

In operation 709, the processor according to various embodiments of the disclosure may enable the access control function using the reservation information.

In operation 711, the processor according to various embodiments of the disclosure may broadcast a beacon signal including an indicator, which indicates that an access using the reservation information is granted (or grantable), via a wireless communication circuit. The beacon signal may include the indicator in a VSIE.

In operation 713, the processor according to various embodiments of the disclosure may receive at least one second reservation information from a second electronic device (e.g., the second electronic device 200 of FIG. 1 and FIG. 3).

In operation 715, the processor according to various embodiments of the disclosure may determine whether the second reservation information is related to the first reservation information. For example, the processor may determine whether the second reservation information is related to the first reservation information, based at least in part on data to be exchanged with the reservation server via a wired communication interface. Herein, the method of determining whether being related to each other is similar to FIG. 3, and thus detailed descriptions thereof will be omitted.

If it is identified in operation 715 that there is no relation, returning to operation 711, the processor according to various embodiments of the disclosure may repeat the aforementioned operations. Otherwise, if it is identified in operation 715 that there is a relation, in operation 717, the processor according to various embodiments of the disclosure may grant an access of the second electronic device. For example, the processor may grant the second electronic device an access to an access point included in the electronic device in order to use the Internet, instead of requesting for credential information from the second electronic device.

Meanwhile, although not shown in FIG. 7, the processor according to various embodiments of the disclosure may identify whether a disable request signal of an access control function is received after granting the access. The disable request signal may be received from a reservation server on a reservation end date. Upon receiving the disable request signal, the processor according to various embodiments of the disclosure may disable the access control function.

Although it is described in FIG. 7 that the reservation server transmits the enable/disable request signal of the access control function to the electronic device, according to some embodiments, the electronic device may receive and store reservation information, and may control whether to enable/disable the access control function on the basis of the reservation information.

Figure 8:
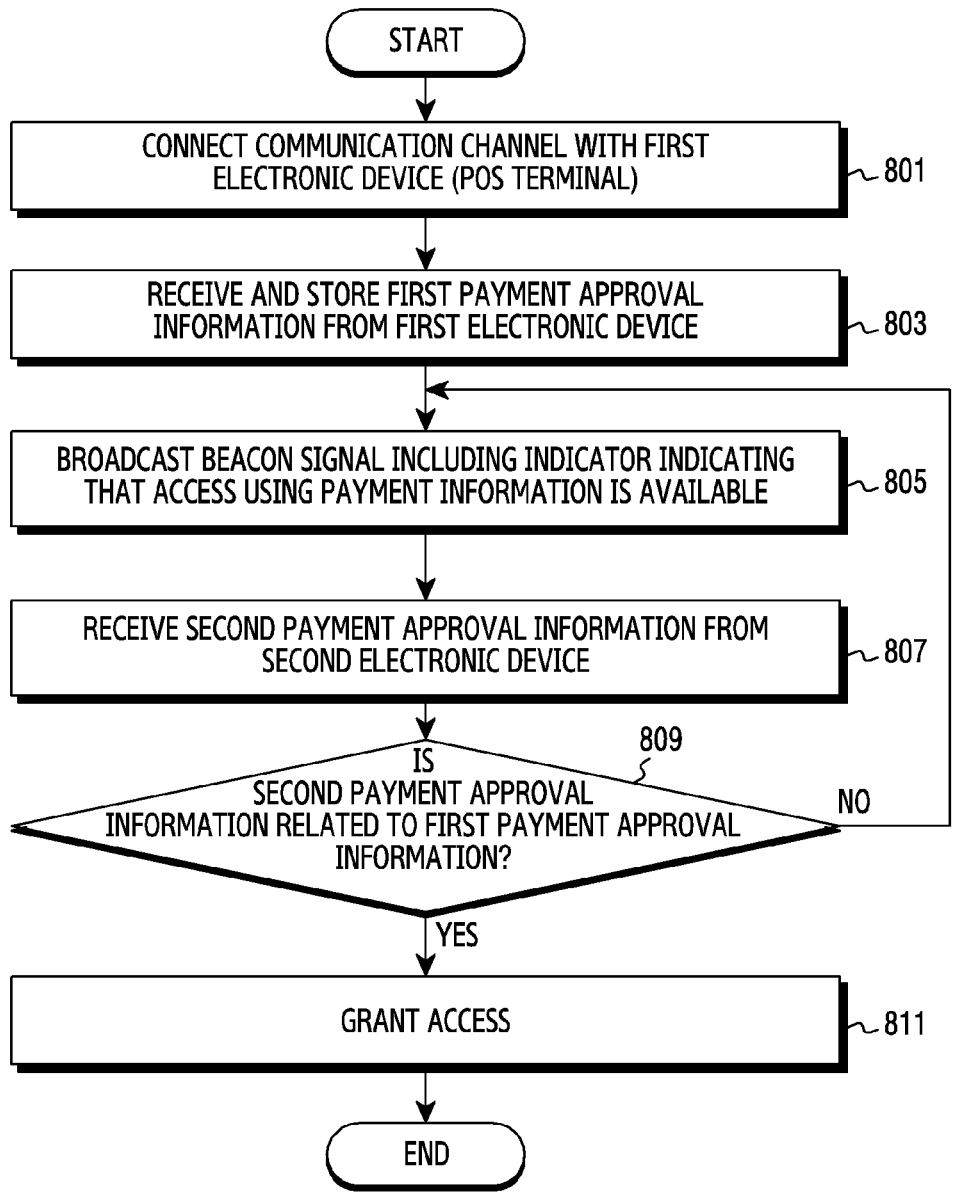
FIG. 8 is a flowchart illustrating a wireless communication control procedure of an electronic device using payment information according to an embodiment of the disclosure.

FIG. 8 is a flowchart illustrating a wireless communication control procedure of an electronic device using payment information according to an embodiment of the disclosure.

Referring to FIG. 8, in operation 801, a processor (e.g., the processor 510 of FIG. 5) of an electronic device (e.g., the first electronic device 100 of FIG. 1 and FIG. 4, the electronic device 500 of FIG. 5) according to an embodiment of the disclosure may connect a communication channel with a first electronic device (e.g., the POS terminal 400 of FIG. 4). For example, the processor may connect the communication channel with the first electronic device via a wireless communication circuit (e.g., the wireless communication circuit 532 of FIG. 5). For example, the electronic device may connect the communication channel with the first electronic device through Bluetooth, BLE, WiFi, or the like. According to some embodiments, the processor may connect the communication channel with the first electronic device via a wired communication interface (e.g., the wired communication interface 531 of FIG. 5).

In operation 803, the processor according to various embodiments of the disclosure may receive and store at least one first payment approval information from the first electronic device. The first payment approval information may be stored in a memory (e.g., the memory 520 of FIG. 5). The first payment approval information may include card information and approval information. The card information may include at least one of a card number, an expiration date, and an encrypted card number. The approval information may include at least one of an approval number and an approval date and time.

In operation 804, the processor according to various embodiments of the disclosure may broadcast a beacon signal including an indicator indicating that an access using payment information is granted (or grantable). For example, the processor may broadcast the beacon signal via a wireless communication circuit. The beacon signal may include the indicator in a VSIE.

In operation 807, the processor according to various embodiments of the disclosure may receive second account information from a second electronic device (e.g., the second electronic device 200 of FIG. 1 and FIG. 4). For example, the processor may receive the second account information via the wireless communication circuit.

In operation 809, the processor according to various embodiments of the disclosure may determine whether the second payment approval information is related to the first payment approval information. For example, the processor may determine whether the second payment approval information is related to the first payment approval information, based at least in part on data to be exchanged with a payment server (e.g., the payment server 300-3 of FIG. 4) via the wired communication interface. According to some embodiments, the processor may compare the first payment approval information stored by being received from the payment server and the second payment approval information received from the second electronic device to determine whether the second payment approval information is related to the first payment approval information.

If it is identified in operation 809 that there is no relation, returning to operation 805, the processor according to various embodiments of the disclosure may repeat the aforementioned operations. Otherwise, if it is identified in operation 809 that there is a relation, in operation 811, the processor according to various embodiments of the disclosure may grant an access of the second electronic device. For example, the processor may grant the second electronic device an access to an access point included in the electronic device in order to use the Internet, instead of requesting for credential information from the second electronic device.

A wireless communication connection control method of an electronic device (e.g., the first electronic device 100 of FIG. 1 and FIG. 2, the electronic device 500 of FIG. 5) according to various embodiments of the disclosure may include: receiving and storing at least one first account information stored in at least one server (e.g., the server 300 of FIG. 1, the social service server 300-1 of FIG. 2) from a first electronic device; broadcasting a beacon signal including an indicator indicating that a WiFi access is granted based at least in part on account information related to the server; receiving at least one second account information from a neighboring electronic device (e.g., the second electronic device 200 of FIG. 1 and FIG. 2) which has received the beacon signal; determining whether the second account information is related to the first account information, based at least in part on data to be exchanged with the server; and upon determining that the second account information is related to the first account information, granting the neighboring electronic device an access to the access point in order to use the Internet, without having to request for credential information from the neighboring electronic device.

According to various embodiments, the beacon signal may include a Vender-Specific Information Element (VSIE) including the indicator.

According to various embodiments, the first account information may include a first user IDentifier (ID), and the second account may include a second user ID.

According to various embodiments, the data may be exchanged with the server by using an Application Programming Interface (API) associated with the server.

According to various embodiments, the data may include an indication which indicates that the second user ID is linked with the first user ID.

According to various embodiment, the determining of whether the second account information is related to the first account information may include selecting at least one matched account information if the number of the first account information and/or the second account information is plural, and determining whether the second account information is related to the first account information by using the selected at least one matched account information.

According to various embodiments, the first account information and the second account information may include a server identifier for identifying a server, and the matched account information may include the same server identifier.

According to various embodiments, the determining of whether the second account information is related to the first account information may include receiving a temporary account verify key from the neighboring electronic device; and requesting the server to authenticate the temporary account verify key.

A wireless communication connection control method of an electronic device (e.g., the first electronic device 100 of FIG. 1 and FIG. 3, the electronic device 500 of FIG. 5) according to various embodiments of the disclosure may include: logging in to at least one reservation server by using at least one account information related to the reservation server (e.g., the server 300 of FIG. 1, the reservation server 300-2 of FIG. 3); receiving an enable request, including at least one first reservation information, for a function which grants a WiFi access, based at least in part on reservation information, from the reservation server; storing the first reservation in formation; after enabling the function, broadcasting a beacon signal including an indicator indicating that a WiFi access is granted based at least in part on the reservation information; receiving at least one second reservation information from a neighboring electronic device (e.g., the second electronic device 200 of FIG. 1 and FIG. 3); determining whether the second reservation information is related to the first reservation information, based at least in part on data to be exchanged with the reservation server; and upon determining that the second reservation information is related to the first reservation information, granting the neighboring electronic device an access to the access point in order to use the Internet, without having to request for credential information from the neighboring electronic device.

According to various embodiments, the method may further include: receiving a disable request of the function from the reservation server; and blocking the neighboring electronic device from accessing to the access point in response to reception of the disable request.

A wireless communication connection control method of an electronic device (e.g., the first electronic device 100 of FIG. 1 and FIG. 4, the electronic device 500 of FIG. 5) according to various embodiments of the disclosure may include: receiving and storing at least one first payment approval information from a first electronic device (e.g., the POS terminal 400 of FIG. 4) coupled with a payment server (E.g., the server 300 of FIG. 1, the payment server 300-3 of FIG. 4); broadcasting a beacon signal including an indicator indicating that a WiFi access is granted based at least in part on payment approval information; receiving at least one second payment approval information from a second electronic device (e.g., the second electronic device 200 of FIG. 1 and FIG. 4); determining whether the second payment approval information is related to the first payment approval information, and upon determining that the second account information is related to the first account information, granting the second electronic device an access to the access point in order to use the Internet, without having to request for credential information from the second electronic device.

According to various embodiments, the determining of whether the second payment approval information is related to the first payment approval information may include determining whether the second payment approval information is related to the first payment approval information, based at least in part on data to be exchanged with the payment server.

According to various embodiments, the first payment approval information and the second payment approval information may include a payment approval date and time. The granting of the second electronic device the access to the access point may include granting the second electronic device the access to the access point during a designated period, based at least in part on the payment approval date and time.

Figure 9:
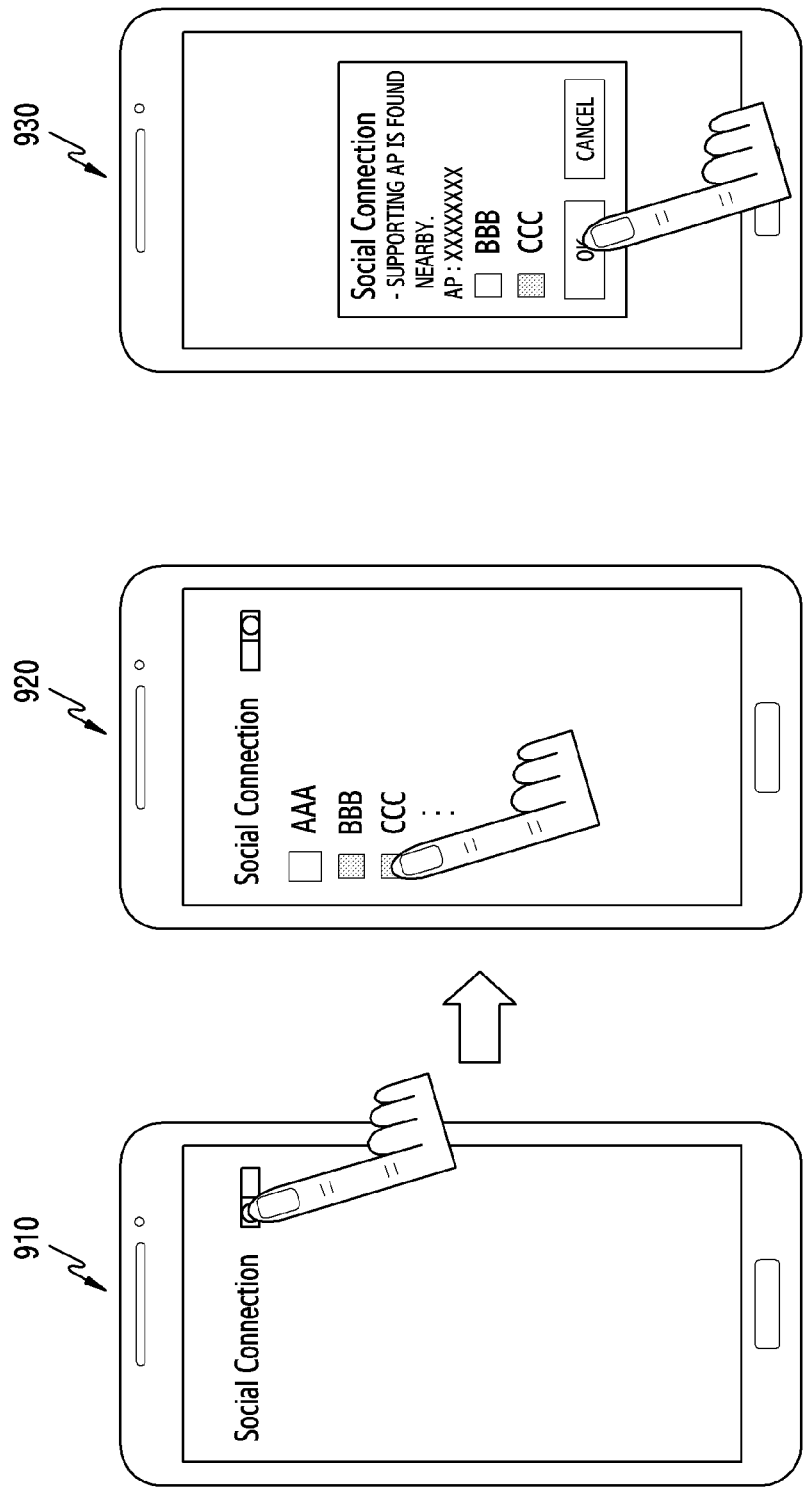
FIG. 9 illustrates an example of a screen of an electronic device according to various embodiments of the disclosure.

FIG. 9 illustrates an example of a screen of an electronic device according to various embodiments.

Referring to FIG. 9, an electronic device (e.g., the second electronic device 200 of FIG. 1 to FIG. 4) according to various embodiments of the disclosure may turn on/off an access control function using account information in response to a user's request. For example, the electronic device may display an on/off menu of the access control function of the account information as indicated by a reference numeral 910.

If the access control function is on, the electronic device may display account information registered in the electronic device in a selectable manner as indicated by the reference numeral 920 in the drawing. The electronic device may use account information selected by a user in a wireless network access. For example, the electronic device may include the selected account information in a wireless network access request signal in operation 205 of FIG. 2.

Upon receiving the beacon signal, the electronic device may automatically access a wireless network by using the selected account information. Meanwhile, if a plurality of pieces of account information are selected, upon receiving the beacon signal, the electronic device may display a popup window to inquire the user which account will be used, as indicated by a reference numeral 930 in the drawing.

Upon selecting an account of "CCC" by the user as indicated by the reference numeral 930 in the drawing, the electronic device may attempt an access to a wireless network by using the account information "CCC".

Figure 10:
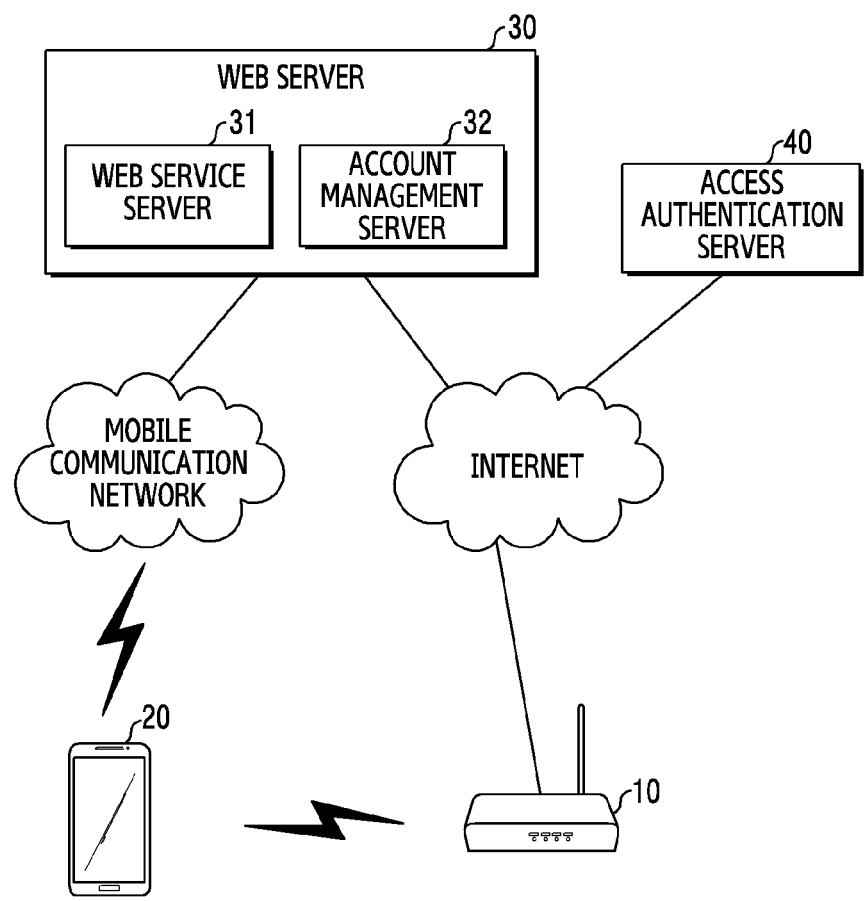
FIG. 10 illustrates a wireless communication system according to an embodiment of the disclosure.

FIG. 10 illustrates a wireless communication system according to an embodiment of the disclosure.

Referring to FIG. 10, a wireless communication system according to an embodiment of the disclosure may include a first electronic device 10, a second electronic device 20, a web server 30, and an access authentication server 40. Hereinafter, detailed descriptions on a structure overlapping with that of the wireless communication system of FIG. 1 will be omitted to avoid redundancy.

The first electronic device 10 (e.g., the first electronic device 10 of FIG. 1 to FIG. 4, the electronic device 500 of FIG. 5) according to an embodiment of the disclosure may be a wireless router. The first electronic device 10 may store account information and domain information received from a user (e.g., a host). For example, the host may register the account information and the domain information to the first electronic device 10 by accessing the first electronic device 10 in a wired or wireless manner via another electronic device (e.g., a smart phone, a tablet PC, a desktop PC, etc.).

The first electronic device 10 according to an embodiment of the disclosure may inquire the access authentication server 40 whether an access to the second electronic device 20 is granted upon detecting the access of the second electronic device 20 (e.g., the second electronic device 200 of FIG. 1 to FIG. 4). The first electronic device 10 may grant or block the access of the second electronic device 20 according to a response for the query. According to some embodiments, the first electronic device 10 may receive an access grant period from the access authentication server 40, and may grant the access of the second electronic device 20 only during the period.

The first electronic device 10 according to an embodiment of the disclosure may include a remote authentication module (not shown) which authenticates whether it is a connectable device. For example, the remote authentication module may use a radius protocol of a WiFi standard to authenticate whether the second electronic device 20 is an accessible device. For example, the remote authentication module may serve as an AAA server. According to some embodiments, the remote authentication module may be included in an additional external server (e.g., a remote authentication server).

The second electronic device 20 according to an embodiment of the disclosure may transmit/receive a variety of information (e.g., account information, payment information, reservation information, a device ID, etc.) for accessing the web server 30 or for using a service. Although the block diagram is not illustrated in detail for convenience of explanation, similarly to the electronic device 500 of FIG. 5, the second electronic device 20 according to an embodiment of the disclosure may include a display (not shown), a communication circuit (e.g., a mobile communication module, a wireless communication circuit) (not shown), a processor (not shown), and/or a memory (not shown) or the like.

The second electronic device 20 according to an embodiment of the disclosure may receive an invitation message for reporting that an access is granted by a user of the first electronic device 10 from the web server 30 via a communication circuit. The invitation message may be received in various manners (e.g., an e-mail, a text message, an SNS message, a push message, etc.). According to some embodiments, the invitation message may include access grant period information. Upon receiving the invitation message, the second electronic device 20 may receive a profile including information (e.g., host account information, domain information, a password, an access token, etc.) required when it is coupled to the first electronic device 10, by requesting the access authentication server 40 to transmit the information. According to some embodiments, the second electronic device 20 may receive network information (e.g., host account information, domain information, password, access token, or the like required for the access to the first electronic device 10 located at a reserved accommodation) related to reservation completed information from the web server 30. The second electronic device 20 according to an embodiment of the disclosure may generate and store a profile on the basis of network information.

The second electronic device 20 may request for the access on the basis of the profile when it is located around (e.g., within a range in which communication is available) the first electronic device 10. The second electronic device 20 may use an Internet service by accessing the first electronic device 10 when the access is granted.

The web server 30 according to an embodiment of the disclosure may include a web service server 31 and an account management server 32.

The web service server 31 according to an embodiment of the disclosure may provide a web service (e.g., an SNS, an accommodation reservation, etc.). The web service server 31 may transmit a network profile (e.g., a friend list and/or an access grant period or the like for granting the access of the first electronic device 10) to the access authentication server 40. For example, when a host (a user of the first electronic device 10) logs in and sets a list of friends, of which an access it to be granted, and/or a grant period, the web service server 31 may transmit the network profile to the access authentication server 40. According to some embodiments, upon completion of a reservation (e.g., an accommodation reservation) of a service from the second electronic device 20, the web service server 31 may transmit, to the second electronic device 20, network information required to access the first electronic device 10 located in the reserved accommodate, and may transmit access permission information to the access authentication server 40. The access permission information may include at least one of reservation information (e.g., date, time, etc.), account information of a guest, and an identifier (e.g., a serial number, a MAC address, a device ID, etc.) of the second electronic device 20.

The account management server 32 according to an embodiment of the disclosure may manage an account of a service user (e.g., a guest, a host, etc.). According to some embodiments, the account management server 32 may be provided separately, instead of being included in the web server 30.

The access authentication server 40 according to an embodiment of the disclosure may control an access of the second electronic device 20 with respect to the first electronic device 10. The access authentication server 40 may store the network profile and/or access permission information of a specific user (guest), received from the web server 30.

Upon receiving from the first electronic device 10 a query regarding whether the access of the second electronic device 20 is granted, the access authentication server 40 according to an embodiment of the disclosure may check whether the access of the second electronic device 20 is granted based on the previously stored network profile or access permission information, and may transmit a result thereof to the first electronic device 10.

Figure 11A:
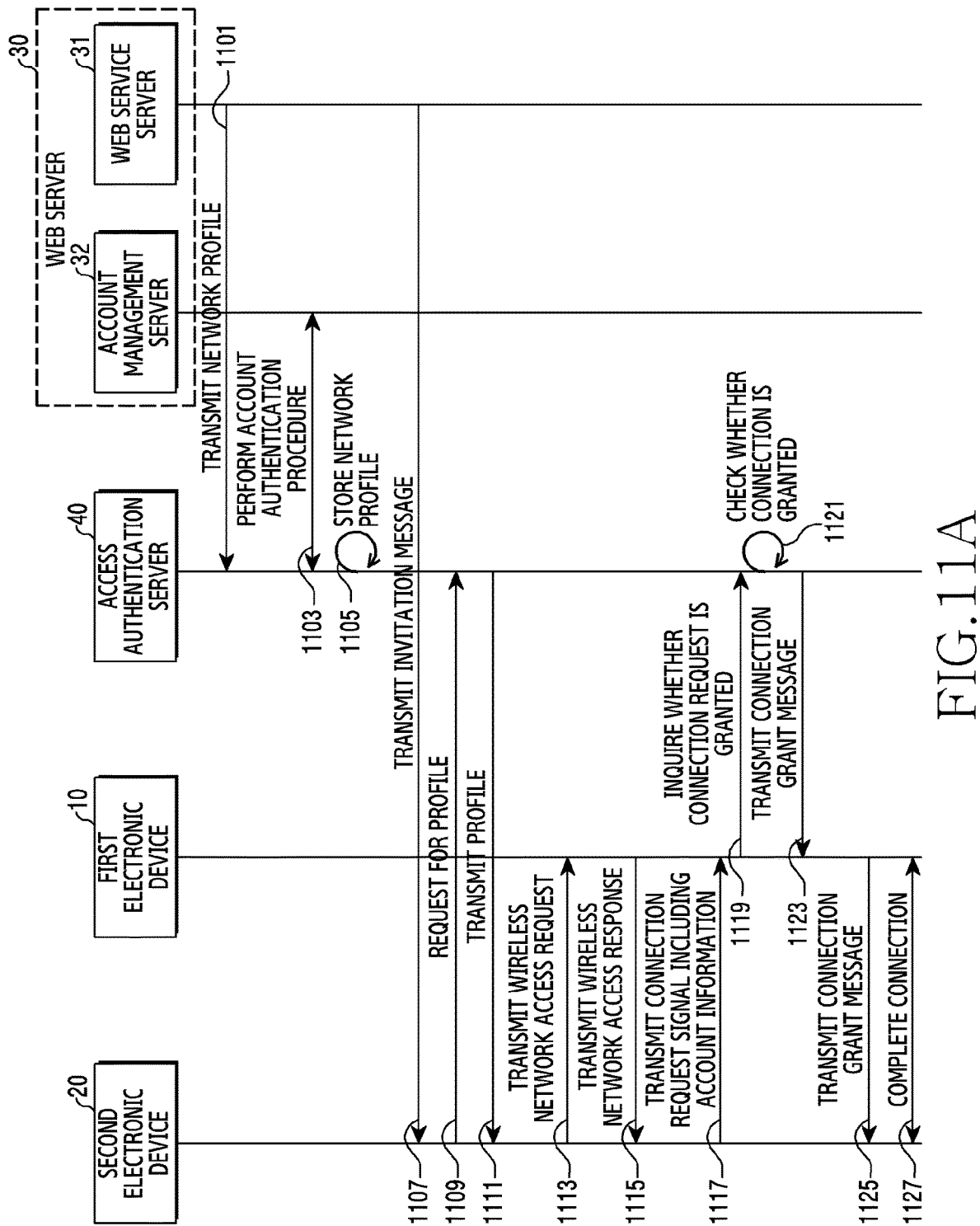
FIG. 11A is a flowchart illustrating a wireless communication connection procedure between electronic devices of a wireless communication system according to an embodiment of the disclosure.

FIG. 11A is a flowchart illustrating a wireless communication connection procedure using account information in a wireless communication system according to an embodiment of the disclosure.

Referring to FIG. 11A, in operation 1101, the web service server 31 of a wireless communication system according to an embodiment of the disclosure may transmit a network profile (e.g., at least one account information for granting an access to the first electronic device 10 and/or an access grant period for each account, etc.) to the access authentication server 40. For example, a host (a user of the first electronic device 10) may log in to an SNS such as Facebook™ to set a friend list of which an access is to be granted and/or a grant period, and may request for transmission to the access authentication server 40.

According to some embodiments, the access authentication server 40 may request the web service server 31 to transmit the friend list of the host and may receive the friend list.

In operation 1103, the access authentication server 40 and account management server 32 according to an embodiment of the disclosure may perform an account authentication procedure. For example, the access authentication server 40 may be coupled to the account management server 32 to check whether at least one account information included in the network profile received in operation 1101 is valid.

In operation 1105, the access authentication server 40 according to an embodiment of the disclosure may store the network profile. For example, when an account is authenticated, the access authentication server 40 may store the network profile.

In operation 1107, the web service server 31 according to an embodiment of the disclosure may transmit an invitation message to the at least one second electronic device 20 of which an access is granted. The invitation message may include information (e.g., a URL address) for accessing the access authentication server 40. The invitation message may be transmitted in various manners (e.g., an e-mail, a text message, an SNS message, a push message, etc.). The second electronic device 20 which has received the invitation message may notify reception of the invitation message to the user in a visual, auditory, and/or tactile manner. For example, the second electronic device 20 may display an icon on a notification bar on which a battery icon, received signal strength, or the like is displayed, may display a popup message, or may provide a sound effect and/or a vibration.

In operation 1109, the second electronic device 20 according to an embodiment of the disclosure may request the access authentication server 40 to transmit a profile. In operation 1111, the access authentication server 40 according to an embodiment of the disclosure may transmit the requested profile to the second electronic device 20. The profile may include information (e.g., host account information, domain information, a password, an access token, etc.) required when the second electronic device 20 is coupled to the first electronic device 10.

Upon completion of operations 1101 to 1111, the first electronic device 10 and second electronic device 20 according to an embodiment of the disclosure may be in a state of being automatically connectable without an input of credential information (e.g., a password) by the user.

In operation 1113, the second electronic device 20 according to an embodiment of the disclosure may transmit a wireless network access request signal to the first electronic device 10. For example, the second electronic device 20 may use the profile received in operation 1111 to transmit the wireless network access request signal to the first electronic device 10.

According to some embodiments, when a plurality of profiles are stored, the second electronic device 20 may transmit the wireless network access request signal by extracting (or selecting) the profile of the first electronic device 10 located in a specific range (e.g., 20m) from a current location on the basis of location information of the first electronic device 10.

In operation 1115, the first electronic device 10 which has received the wireless network access request signal may transmit the wireless network response signal to the second electronic device 20.

In operation 1117, the second electronic device 20 according to an embodiment of the disclosure may transmit a connection request message including account information to the first electronic device 10. For example, the second electronic device 20 may transmit to the first electronic device 10 the connection request message including at least one of host account information, domain information, and a device ID.

In operation 1119, the first electronic device 10 according to an embodiment of the disclosure may transmit to the access authentication server 40 a message for inquiring whether the connection request is granted. In this case, the first electronic device 10 may transmit to the access authentication server 40 at least one of the account information and device ID of the second electronic device 20.

In operation 1121, the access authentication server 40 according to an embodiment of the disclosure may check whether the connection is granted. For example, the access authentication server 40 may compare at least one of received account information and device ID and the network profile stored in operation 1105 to check whether the connection is granted.

If the check result shows that the connection is granted, in operation 1123, the access authentication server 40 according to an embodiment of the disclosure may transmit a connection grant message to the first electronic device 10. According to some embodiments, the connection grant message may include connectable period information (e.g., a grant period).

In operation 1125, the first electronic device 10 according to an embodiment of the disclosure may transmit the connection grant message to the second electronic device 20. In response to reception of the connection grant message, in operation 1127, the second electronic device 20 may be coupled to the first electronic device 10 and thus be able to use the Internet.

Figure 11B:
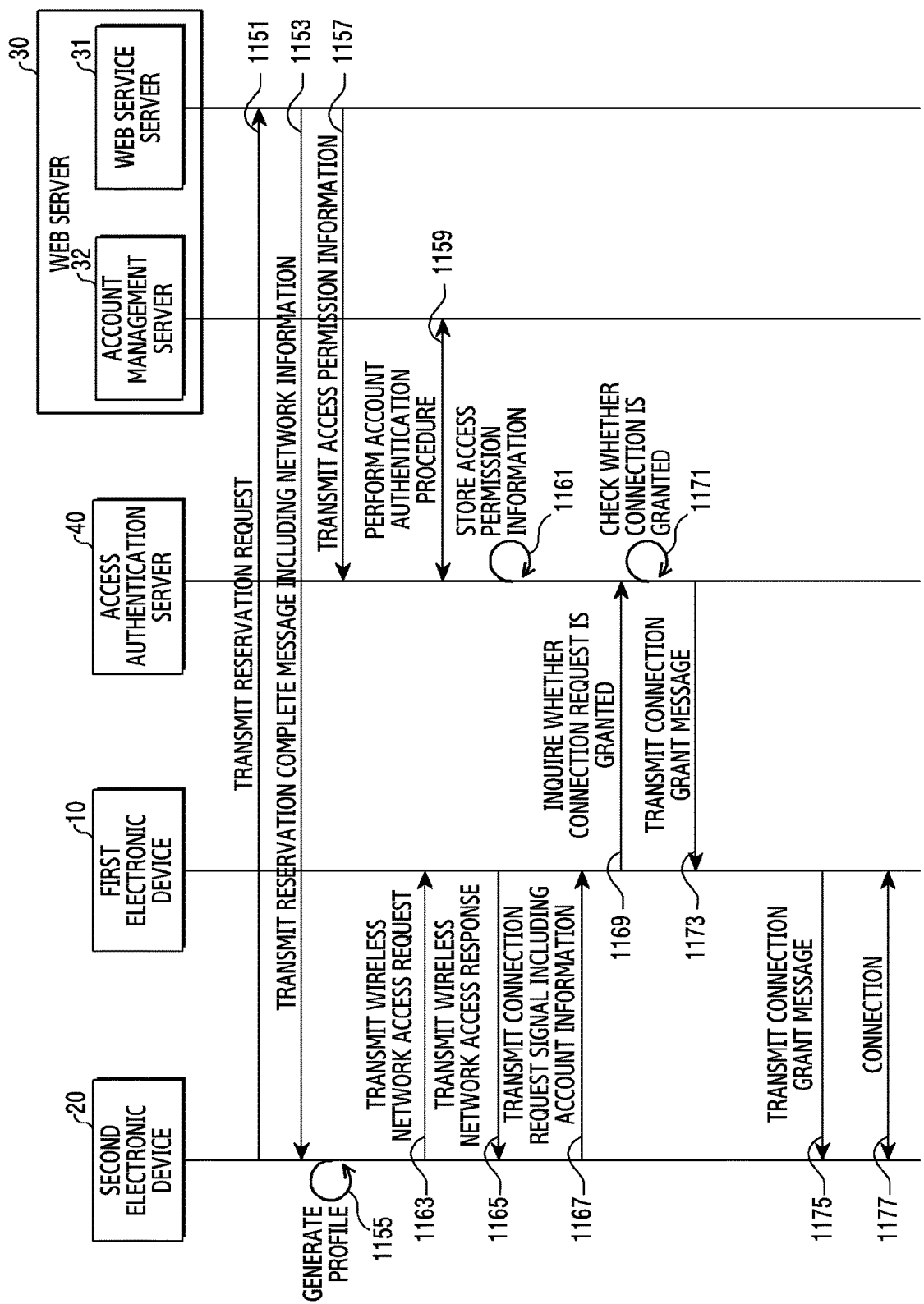
FIG. 11B is a flowchart illustrating a wireless communication connection procedure between electronic devices of a wireless communication system according to an embodiment of the disclosure.

FIG. 11B is a flowchart illustrating a wireless communication connection procedure using reservation information in a wireless communication system according to an embodiment of the disclosure.

Before detailed descriptions, it is assumed hereinafter that a host (e.g., a user of the first electronic device 10) has already registered account information and domain information thereof to the first electronic device 10 or a management server. The account information may include an ID or password to log in to at least one reservation site providing a reservation service such as a hotel, a restaurant, a theater, a concert hall, or the like. The domain information may include a location of the first electronic device 10, a network speed, a network type, or the like.

Referring to FIG. 11B, in operation 1151, the second electronic device 20 of a wireless communication system according to an embodiment of the disclosure may transmit a reservation request to the web service server 31 of the web server 30. For example, a guest (e.g., a user of the second electronic device 20) may log in to the web service server 31 to reserve an accommodation for a specific date or a specific period.

Upon completion of the reservation, in operation 1153, the web service server 31 may transmit a reservation complete message including network information to the second electronic device 20. The network information may include information (e.g., host account information, domain information, a password, an access token, etc.) required when the second electronic device 20 is coupled to the first electronic device 10.

In operation 1155, the second electronic device 20 according to an embodiment of the disclosure may use the network information to generate and store a profile.

In operation 1157, the web service server 31 according to an embodiment of the disclosure may transmit access permission information to the access authentication server 40. The access permission information may include reservation information (e.g., date, time, etc.), account information of a guest, and an identifier (e.g., a serial number, a MAC address, a device ID, etc.) of the second electronic device 20. According to some embodiments, the operation 1157 may be replaced with an operation in which the second electronic device 20 transmits access permission information to the access authentication server 40.

In operation 1159, the access authentication server 40 according to an embodiment of the disclosure may perform an account authentication procedure. For example, the access authentication server 40 may be coupled to the account management server 32 to check whether the account information received in operation 1157 is valid.

In operation 1161, the access authentication server 40 according to an embodiment of the disclosure may store the access authentication information. For example, the access authentication server 40 may store the access authentication information when the account information is valid.

Upon completion of operations 1151 to 1161, the first electronic device 10 and second electronic device 20 according to an embodiment of the disclosure may be in a state of being automatically connectable without an input of credential information (e.g., a password) by the user.

In operation 1163, the second electronic device 20 according to an embodiment of the disclosure may transmit a wireless network access request signal to the first electronic device 10. For example, the second electronic device 20 may use the profile generated in operation 1155 to transmit the wireless network access request signal to the first electronic device 10.

According to some embodiments, the second electronic device 20 may store the profile in association with reservation information, and may extract (or select) a proper profile on the basis of the reservation information (e.g., a date, a time, and a location) to transmit a wireless network access request signal.

In operation 1165, the first electronic device 10 which has received the wireless network access request signal may transmit the wireless network access response signal to the second electronic device 20.

In operation 1167, the second electronic device 20 according to an embodiment of the disclosure may transmit a connection request message including account information to the first electronic device 10. According to some embodiments, the second electronic device 20 may also transmit at least one of host account information, domain information, a reservation date, and a device ID.

In operation 1169, the first electronic device 10 according to an embodiment of the disclosure may transmit to the access authentication server 40 a message for inquiring whether the connection request is granted. In this case, the first electronic device 10 may transmit to the access authentication server 40 at least one of account information, date information, and a device ID.

In operation 1171, the access authentication server 40 according to an embodiment of the disclosure may check whether the connection is granted. For example, the access authentication server 40 may compare at least one of received account information, date information, and device ID and the access permission information stored in operation 1171 to check whether the connection is granted.

If the check result shows that the connection is granted, in operation 1173, the access authentication server 40 according to an embodiment of the disclosure may transmit a connection grant message to the first electronic device 10. According to some embodiments, the connection grant message may include connectable period information (e.g., a reservation period). Although not shown, if the check result shows that the connection is granted, the access authentication server 40 may transmit a connection reject message to the first electronic device 10. The first electronic device 10 may transmit the connection reject message to the second electronic device 20.

In operation 1175, the first electronic device 10 according to an embodiment of the disclosure may transmit the connection grant message to the second electronic device 20. In response to reception of the connection grant message, in operation 1177, the second electronic device 20 may be coupled to the first electronic device 10 and thus be able to use the Internet.

The first electronic device 10 and second electronic device 20 according to various embodiments of the disclosure may use various authentication protocols to support an automatic access through an invitation message or a reservation message. For example, the first electronic device 10 and the second electronic device 20 may automatically have access through a Hotspot 2.0 technology. Hereinafter, an automatic access procedure will be described in detail by taking an example of a case of using Extensible Authentication Protocol (EAP)-PWD and EAP-TTLS. However, various embodiments of the disclosure are not limited to the use of EAP-PWD or EAP-TTLS.

Figure 12A:
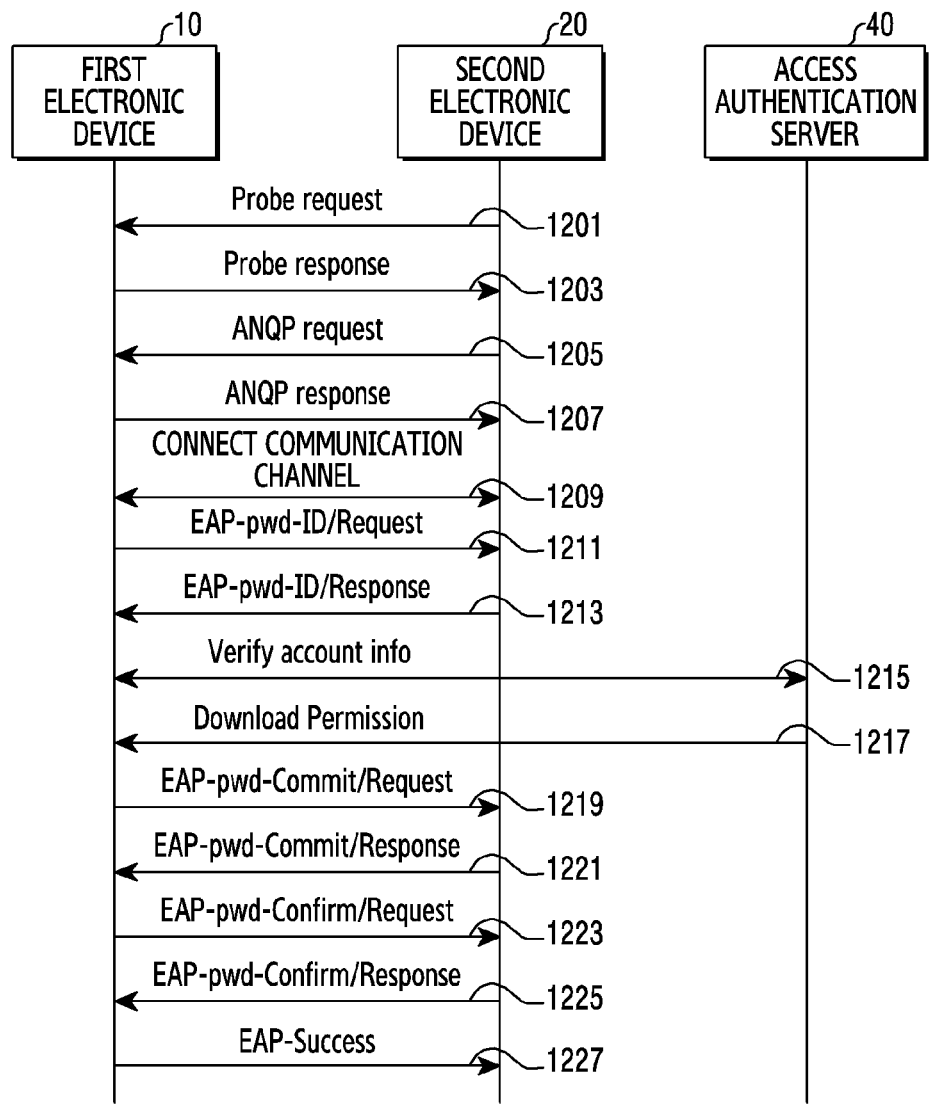
FIG. 12A is a flowchart illustrating a wireless communication connection procedure between electronic devices in detail according to various embodiments of the disclosure.

FIG. 12A is a flowchart illustrating a wireless communication connection procedure between electronic devices in detail according to various embodiments of the disclosure.

Referring to FIG. 12A, in operation 1201, the second electronic device 20 according to an embodiment of the disclosure may transmit a probe request to the first electronic device 10. The probe request may be transmitted based on the profile generated in operation 1105 of FIG. 11. For example, the second electronic device 20 may broadcast a probe request message for each channel to search for a connectable wireless router (e.g., an access point). In operation 1203, the first electronic device 10 according to an embodiment of the disclosure may transmit a probe response to the second electronic device 20.

In operation 1205, the second electronic device 20 according to an embodiment of the disclosure may transmit an Access Network Query Protocol (ANQP) request to the first electronic device 10. For example, the second electronic device 20 may transmit the ANQP request to the first electronic device 10 when the probe response includes an element (e.g., HotSpot (HS) 2.0 indication element) indicating whether the probe response supports an automatic access, or when an interworking bit of "extended capabilities element" is 1. The ANQP request may be a message which requests for information of an access point supporting the HS 2.0. For example, the information may include a name, WAN metrics, connection capability, an operating class indication, an OSU supplier list, an icon binary file, or the like. In operation 1207, the first electronic device 10 according to an embodiment of the disclosure may transmit an ANQP response to the second electronic device 20.

In operation 1209, the first electronic device 10 and second electronic device 20 according to an embodiment of the disclosure may be connected to a communication channel. The operation 1209 may be in a state where only the communication channel is connected and an access is not granted.

In operation 1211, the first electronic device 10 according to an embodiment of the disclosure may transmit an EAP-pwd-ID request to the second electronic device 20. The EAP-pwd-ID request may include a cipher suite configured in the first electronic device 10, an ID of the first electronic device 10, a random anti-clogging token, a password pre-processing scheme, or the like.

According to an embodiment of the disclosure, in operation 1213, the second electronic device 20 which has received the EAP-pwd-ID request may transmit an EAP-pwd-ID response to the first electronic device 10. The EAP-pwd-ID response according to an embodiment of the disclosure may include account information.

In response to reception of the EAP-pwd-ID response, in operation 1215, the first electronic device 10 according to an embodiment of the disclosure may perform an account verify procedure (verify account info) with respect to the access authentication server 40.

If the account verification is complete (if it is identified as a valid account), in operation 1217, the access authentication server 40 according to an embodiment of the disclosure may transmit an access permission (or download permission) to the first electronic device 10.

In operation 1219, the first electronic device 10 according to an embodiment of the disclosure may transmit an EAP-pwd-Commit/request to the second electronic device 20. In operation 1221, the second electronic device 20 according to an embodiment of the disclosure may transmit an EAP-pwd-Commit/response to the first electronic device 10. For example, the second electronic device 20 may verify a total payload length on the basis of an expected length of Element_S and Scalar_S, and may extract the Element_S and the Scalar_S if the total payload length is correct. The second electronic device 20 may verify the Element_S and the Scalar_S, and if there is no abnormality, may calculate Element_P and Scalar_P derived from any values p_rand and p_mask, and may generate a key kp. The second electronic device 20 may transmit the Element_P and the Scalar_P to the first electronic device 10 as the EAP-pwd-Commit/response. Since this conforms to the RFC5931 2.8.4.1 standard, detailed descriptions thereof will be omitted.

In operation 1223, the first electronic device 10 according to an embodiment of the disclosure may transmit an EAP-pwd-Confirm/Request to the second electronic device 20. For example, the first electronic device 10 may generate ks from Element_P and Scalar_P, calculate Confirm_S from Element_S and Scalar_S and Element_P and Scalar_P, and transfer it to the second electronic device 20. Since this conforms to the RFC5931 2.8.4 standard, detailed descriptions thereof will be omitted.

In operation 1225, the second electronic device 20 according to an embodiment of the disclosure may transmit an EAP-pwd-Confirm/Response to the first electronic device 10. For example, the second electronic device 20 verifies a total payload length on the basis of an expected length of Confirm_S. If the total payload length is correct, the second electronic device 20 may extract Confirm_S and verify whether it is a value generated based on the key kp. If it is the value generated based on the key kp, the second electronic device 20 may calculate Confirm_P and transmit it to the first electronic device 10.

In operation 1227, the first electronic device 10 according to an embodiment of the disclosure may transmit an EAP success message to the second electronic device 20. For example, the first electronic device 10 verifies the total payload length on the basis of the expected length of Confirm_P. If the total payload length is correct, the first electronic device 10 may extract Confirm_P and verify whether it is a value generated based on ks. If the Confirm_P is the value generated based on Ks, the first electronic device 10 may generate MK and transfer a generated EAP-Success message to a terminal. Since this conforms to the RFC5931 2.8.4 standard, detailed descriptions thereof will be omitted.

FIG. 12 is a flowchart illustrating a wireless communication connection procedure between electronic devices in detail according to various embodiments of the disclosure.

Figure 12B:
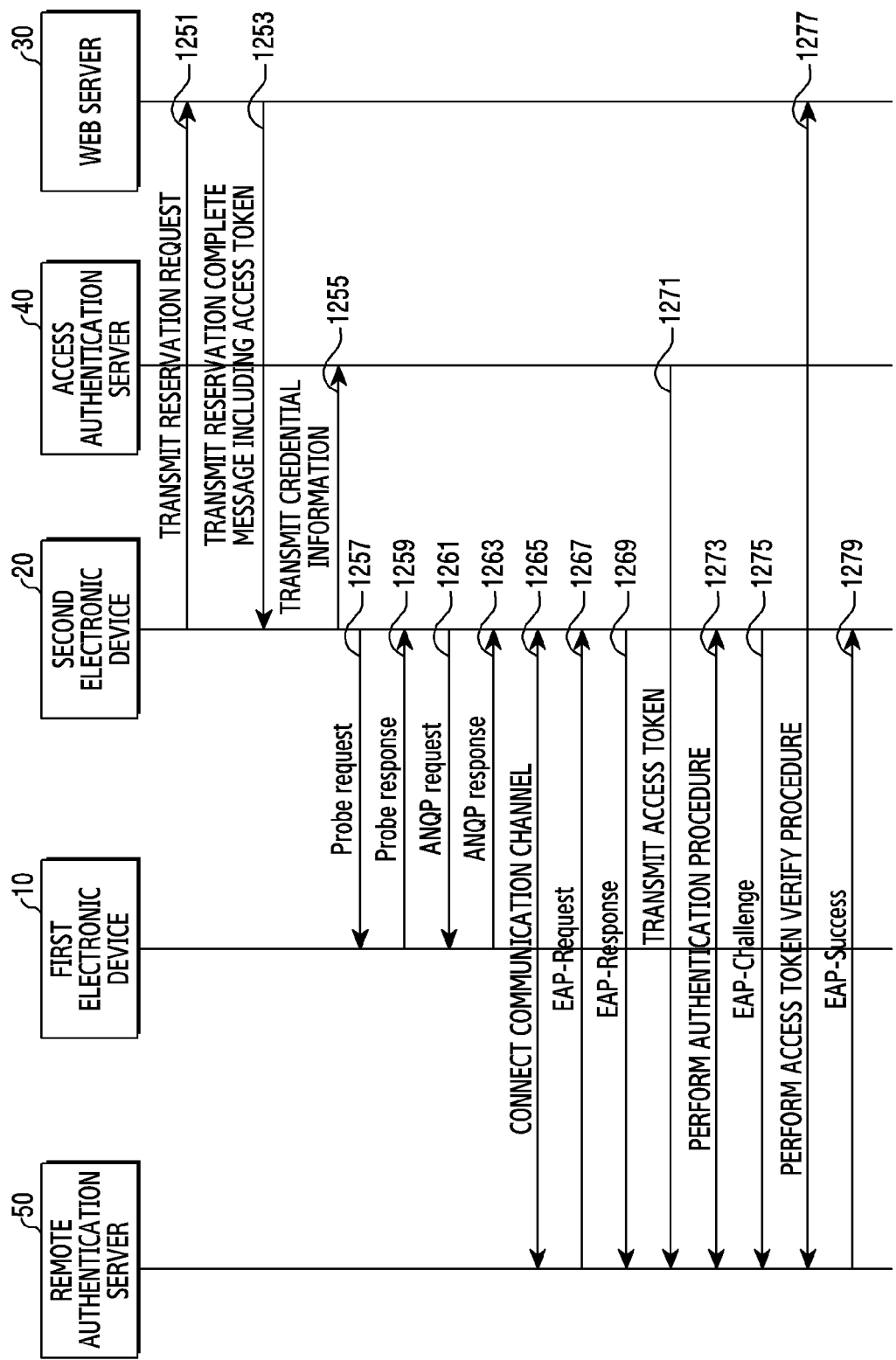
FIG. 12B is a flowchart illustrating a wireless communication connection procedure between electronic devices in detail according to various embodiments of the disclosure.

Referring to FIG. 12B, in step 1251, the second electronic device 20 according to an embodiment of the disclosure may transmit a reservation request to the web server 30. For example, a user (a guest) of the second electronic device 20 may access the web server 30 for accommodation reservation, and may reserve an accommodation on a specific date.

In step 1253, the web server 30 according to an embodiment of the disclosure may transmit a reservation complete message including an access token in response to the reservation request. In operation 1255, the second electronic device 20 according to an embodiment of the disclosure may transmit user's credential information (e.g., an access token ID, an access grant period, etc.) to the access authentication server 40. According to some embodiments, the operation 1255 may be replaced with an operation in which the web server 30 transmits access permission information to the access authentication server 40.

In operation 1257, the second electronic device 20 according to an embodiment of the disclosure may transmit a probe request to the first electronic device 10. In operation 1259, the first electronic device 10 according to an embodiment of the disclosure may transmit a probe response to the second electronic device 20.

In operation 1261, the second electronic device 20 according to an embodiment of the disclosure may transmit an Access Network Query Protocol (ANQP) request to the first electronic device 10. In operation 1263, the first electronic device 10 according to an embodiment of the disclosure may transmit an ANQP response to the second electronic device 20. Since the operations 1257 to 1263 are similar to the operations 1201 to 1207 of FIG. 12A, detailed descriptions thereof will be omitted.

In operation 1265, the remote authentication server 50 and the second electronic device 20 may be connected to a communication channel. The operation 1265 may be in a state where only the communication channel is connected and an access is not granted. The remote authentication server 50 may use a radius protocol of a WiFi standard to authenticate whether the second electronic device 20 is an accessible device. For example, the remote authentication server 50 may be an AAA server. Although it is illustrated in FIG. 12B that the remote authentication server 50 is a separate external server, according to some embodiments, a function of the remote authentication server 50 may be included in the first electronic device 10.

In operation 1267, the remote authentication server 50 according to an embodiment of the disclosure may transmit an EAP-Request to the second electronic device 20. For example, the remote authentication server 50 may generate the EAP-Request, of which an identify item is empty, and transmit it to the second electronic device 20 in order to request for transmission of account information (an account ID) and an access token. In operation 1269, the second electronic device, which has received the EAP-Request, may transmit an EAP-Response to the remote authentication server 50. The EAP-Response may include the account information (e.g., the account ID) and the access token.

In operation 1271, the access authentication server 40 according to an embodiment of the disclosure may transmit the access token from the remote authentication server 50.

In operation 1273, the remote authentication server 50 and second electronic device 20 according to an embodiment of the disclosure may perform an authentication procedure. For example, the remote authentication server 50 may identify whether the second electronic device 20 is a valid electronic device which is connectable with the first electronic device 10. The remote authentication server 50 may transmit an EAP-TTLS/Start message and thus attempt to set a Transport Layer Security (TLS) tunnel with respect to the second electronic device 20. The second electronic device 20 may respond using Client hello. The remote authentication server 20 may transmit to the second electronic device 20 a TLS record and a server certificate in which a public key thereof is stored, and may wait for a response. The second electronic device 20 may compare content of the certificate by using the public key stored in the server certificate and thus authenticate the remote authentication server 50.

In operation 1275, the second electronic device 10 according to an embodiment of the disclosure may transmit an EAP-Challenge to the remote authentication server 50. For example, the second electronic device 200 may transmit a hash value generated by an MD5 scheme to the remote authentication server 50 through the EAP-Challenge by using a password thereof, a challenge value as a random value, and a sequence number (ID) value.

In operation 1277, the remote authentication server 50 and web server 30 according to an embodiment of the disclosure may perform an access token verify procedure. According to some embodiments, the operation 1277 may be performed between the operation 1271 and the operation 1273, or may be performed between the operation 1273 and the operation 1275.

When the verification of the access token is complete, in operation 1279, the remote authentication server 50 according to an embodiment of the disclosure may transmit an EAP success message to the second electronic device 20. For example, the remote authentication server 50 may calculate a hash value by using an account ID transmitted from the second electronic device 20, and may transmit the EAP success message to the second electronic device 20 if the hash values are identical.

An electronic device (e.g., the electronic device 500 of FIG. 5, the first electronic device 10 of FIG. 10 to FIG. 12B) according to various embodiments of the disclosure may include: a housing; and an access point inside the housing. The access point may include: a wired communication interface (e.g., the wired communication interface 531 of FIG. 5) configured to be coupled to the Internet; a wireless communication circuit (e.g., the wireless communication circuit 532 of FIG. 5) configured to support a WiFi protocol; a processor (e.g., the processor 510 of FIG. 5) operatively coupled to the wired communication interface and the wireless communication circuit; and a memory (e.g., the memory 520 of FIG. 5) operatively coupled to the processor. The memory stores instructions, when executed, for allowing the processor to: receive an access request including account information from at least one different electronic device via the wireless communication circuit; transmit to a pre-designated server (e.g., the access authentication server 40 of FIG. 10 to FIG. 12B) a query message for inquiring whether to grant an access of the different electronic device; grant the different electronic device the access to the access point in order to use the Internet or block the access, without having to request for a credential information input by a user of the different electronic device, based on a response message received from the server.

According to various embodiments, the memory may further store account information of a user of the electronic device and domain information of the electronic device.

According to various embodiments, the query message may include an access token and account information of the user of the electronic device.

According to various embodiments, if the response message is a message for granting the access, the response message may further include a grant period.

According to various embodiments, the memory may further store instructions, whether executed, for allowing the processor to receive a wireless network access request from the different electronic device, and to transmit a response signal to the different electronic device by identifying whether it is a device which is automatically accessible to the electronic device.

An electronic device (e.g., the second electronic device 20 of FIG. 10 to FIG. 12B) according to various embodiments of the disclosure may include: a display; a mobile communication circuit; a wireless communication circuit configured to support a WiFi protocol; a processor operatively coupled to the mobile communication circuit and the wireless communication circuit; and a memory operatively coupled to the processor. The memory may store instructions, when executed, for allowing the processor to: receive an invitation message for reporting that an access to the external electronic device and the wireless communication network is available via the mobile communication circuit or the wireless communication circuit; notify the reception of the invitation message via the display in a visible manner; and receive a profile including information required for the access to the external electronic device by requesting a pre-designated server to transmit the profile.

The memory according to various embodiments may further store instructions, when executed, for allowing the processor to: request the external electronic device to access a wireless network by using the profile in response to searching for the external electronic device; and upon receiving an access permission message from the external electronic device, access an access point of the external electronic device to use the Internet.

The invitation message according to various embodiments may be received as at least one of a text message, an SNS message, an e-mail, and a push message.

The profile according to various embodiments may include at least one of account information, domain information, password, and access token of the external electronic device.

The memory according to various embodiments may further store instructions, when executed, for allowing the processor to output a popup window at one side of the display to inquire whether to download the profile, and request the server to transmit the profile according to a user's election.

Figure 13:
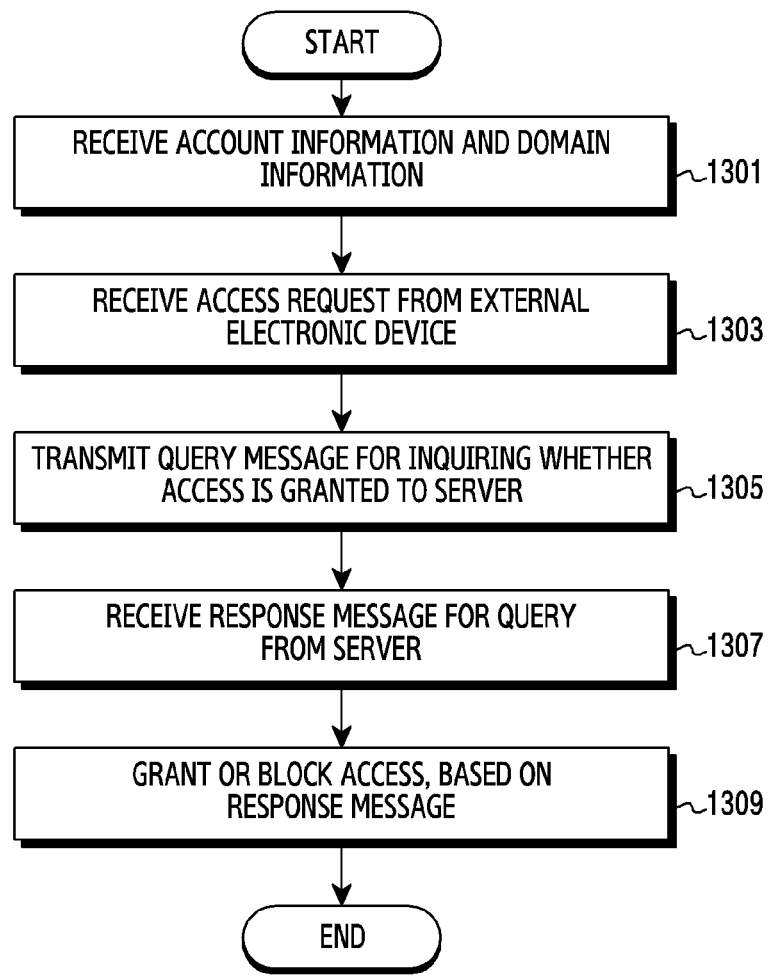
FIG. 13 is a flowchart illustrating a wireless communication connection control procedure of an electronic device according to an embodiment of the disclosure.

FIG. 13 is a flowchart illustrating a wireless communication connection control procedure of an electronic device according to an embodiment of the disclosure.

Referring to FIG. 13, in operation 1301, a processor (e.g., the processor 510 of FIG. 5) of an electronic device (e.g., the first electronic device 10 of FIG. 10) according to an embodiment of the disclosure may receive account information and domain information. The received account information and domain information may be stored in a memory of the electronic device. For example, a user (or an administrator) of the electronic device may register the account information and the domain information to the electronic device by accessing the electronic device via a different electronic device (e.g., a smart phone, a tablet PC, a PC, etc.).

In operation 1303, the processor according to various embodiments of the disclosure may receive an access request from the different electronic device (e.g., an electronic device of a guest or the second electronic device 20 of FIG. 10). The access request may include account information and/or an access token.

In operation 1305, the processor according to various embodiments of the disclosure may transmit a query message for inquiring whether an access is granted, to a pre-set server (e.g., the access authentication server 40 of FIG. 10). For example, in operation 1301, the processor may transmit the query message to the server by using the account information and domain information received in operation 1301.

In operation 1307, the processor according to various embodiments of the disclosure may receive a response message for the query. The response message may be an access grant or reject message. According to some embodiments, the access grant message may further include a grant period.

In operation 1309, the processor according to various embodiments of the disclosure may grant or block an access of the different electronic device on the basis of the response message. For example, if the response message indicates that the access is granted, the processor may grant the different electronic device an access to an access point included in the electronic device in order to use the Internet.

Meanwhile, although not shown in FIG. 13, the processor according to various embodiments of the disclosure may block the access of the different electronic device at the expiry of the access grant period.

A wireless communication connection control method of an electronic device according to various embodiments of the disclosure may include: receiving an access request including account information from at least one different electronic device via the wireless communication circuit; transmitting to a pre-designated server a query message for inquiring whether to grant an access of the different electronic device; granting the different electronic device the access to the access point in order to use the Internet or blocking the access, without having to request for a credential information input by a user of the different electronic device, based on a response message received from the server.

According to various embodiments, the method may further include registering, to the electronic device, account information of a user of the electronic device and domain information of the electronic device.

According to various embodiments, the query message may include an access token and account information of the user of the electronic device.

According to various embodiments, the response message may include an access grant period of the different electronic device.

According to various embodiments, the method may further include: receiving a wireless network access request from the different electronic device; and transmitting a response signal to the different electronic device by identifying whether it is a device which is automatically accessible to the electronic device.

Figure 14:
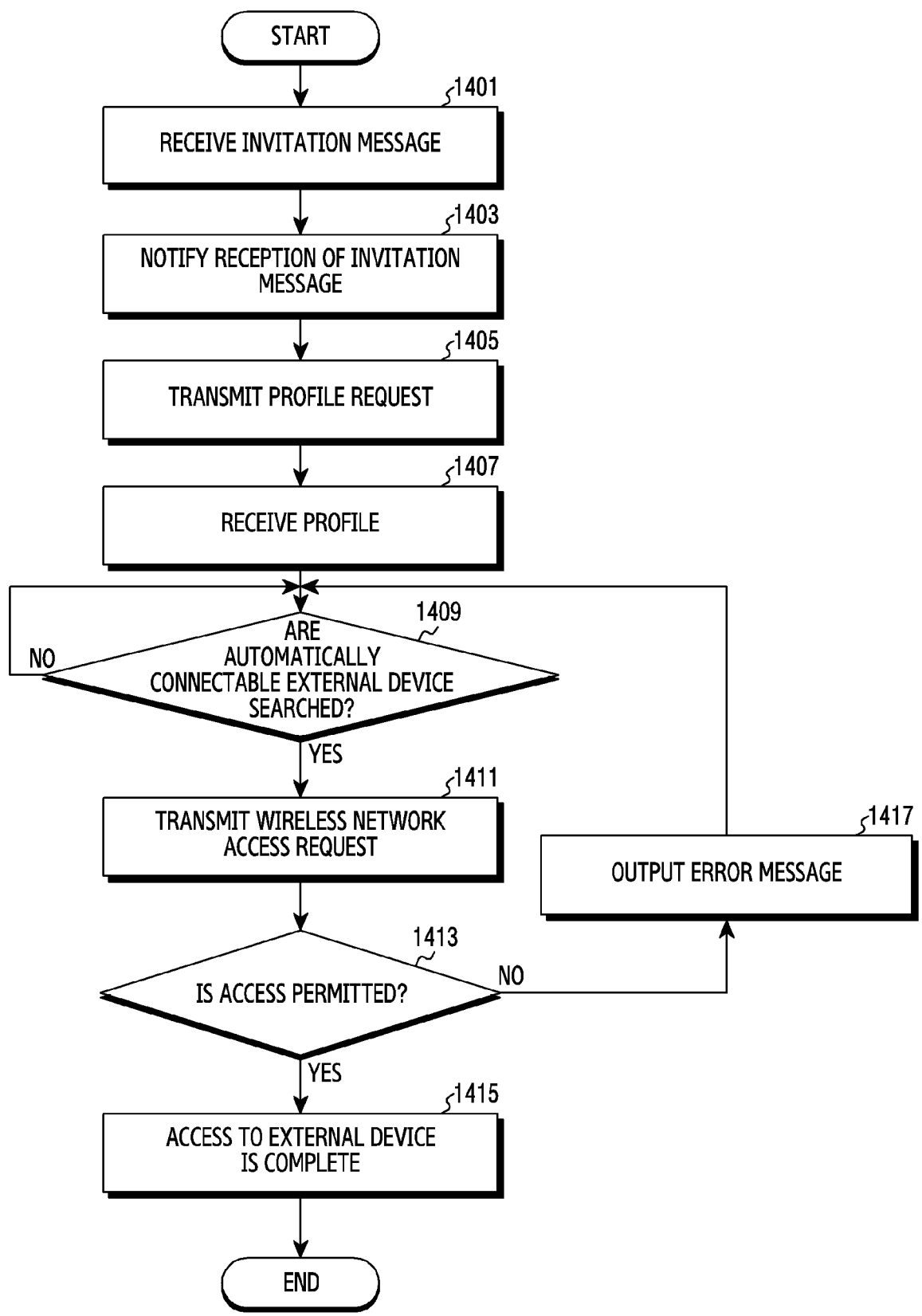
FIG. 14 is a flowchart illustrating a wireless communication control procedure of an electronic device according to an embodiment of the disclosure.
Figure 15:
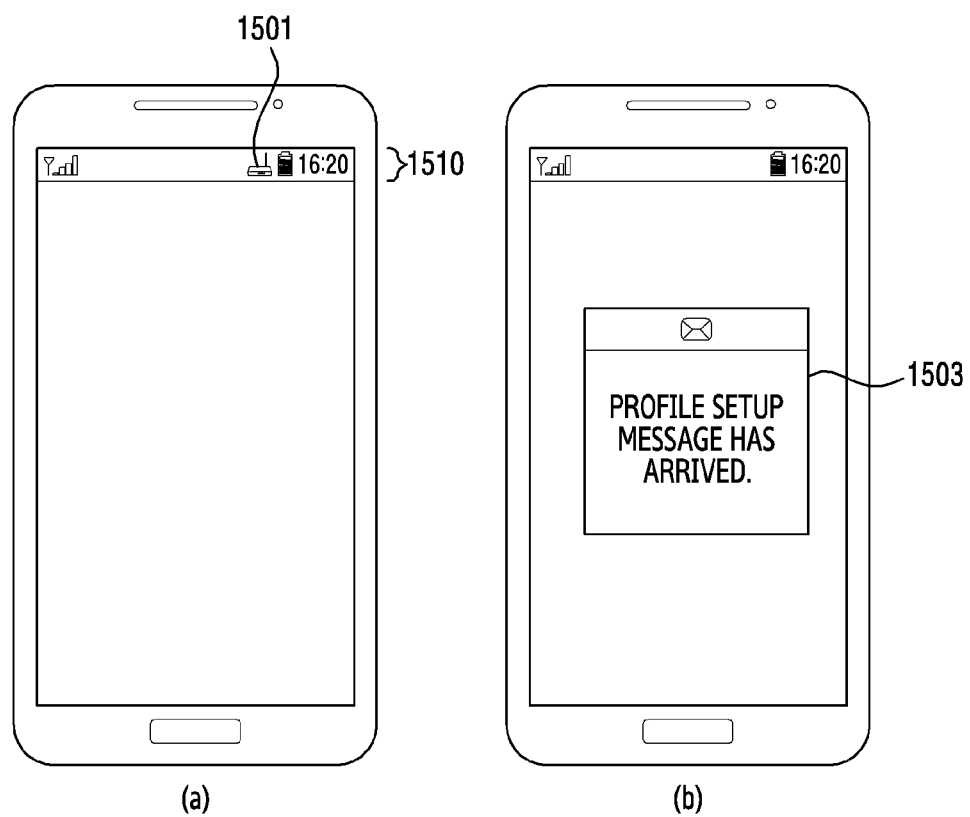
FIG. 15 illustrates an example of a screen of an electronic device according to an embodiment of the disclosure.
Figure 15:
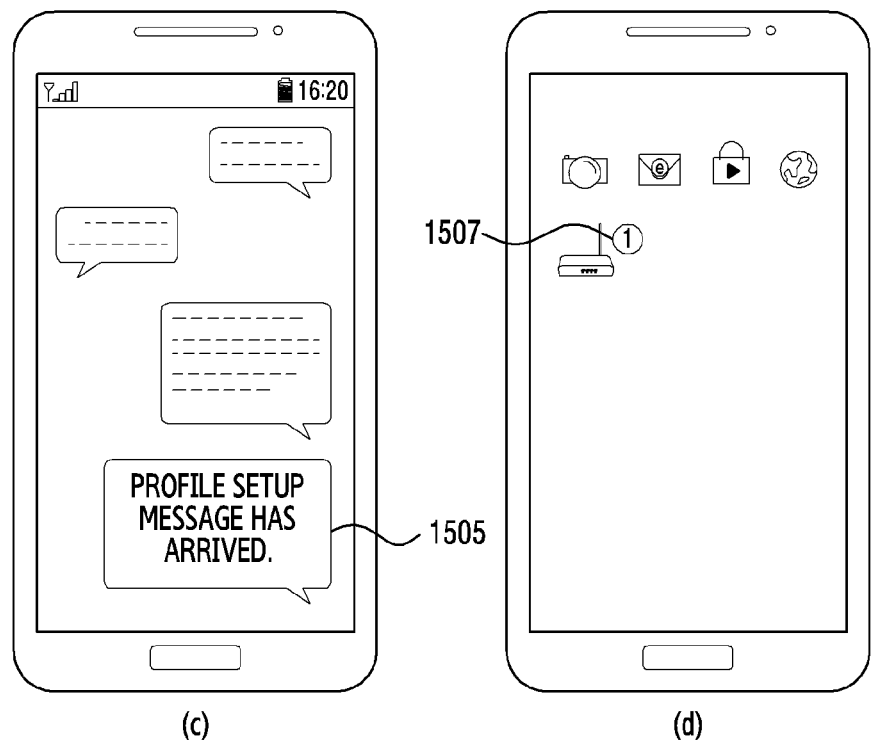

FIG. 14 is a flowchart illustrating a wireless communication control procedure of an electronic device according to an embodiment of the disclosure, and FIG. 15 illustrates an example of a screen of an electronic device according to an embodiment of the disclosure.

Referring to FIG. 14 and FIG. 15, in operation 1401, an electronic device (e.g., the second electronic device 20 of FIG. 10, the second electronic device 20 of FIG. 11A) according to an embodiment of the disclosure may receive an invitation message. The invitation message may be received in various manners (e.g., an e-mail, a text message, an SNS message, a push message, etc.).

In operation 1403, the processor according to an embodiment of the disclosure may notify reception of the invitation message. According to some embodiments, the invitation message may include information (e.g., a URL address) for accessing the access authentication server 40. The reception of the invitation message may be notified in a visual, auditory, and/or tactile manner. For example, the processor may display an indicator 1501 on a notification bar 1510 as shown in (a) of FIG. 15. Alternatively, the processor may display a popup window 1503 as shown in (b) of FIG. 15. Alternatively, the processor may display an SNS message 1505 as shown in (c) of FIG. 15. Alternatively, the processor may display an indicator 1507 at one side of an icon for controlling a short-range wireless communication connection as shown in (d) of FIG. 15. The indicator 1507 may be a numeric value corresponding to the number of unidentified invitation messages. According to some embodiments, the processor may provide a sound effect and/or a vibration together to notify reception of the invitation message.

In operation 1405, the processor according to an embodiment of the disclosure may request an access authentication server (e.g., the access authentication server 40 of FIG. 10, the access authentication server 40 of FIG. 11A) to transmit a profile. The profile may include information (e.g., host account information, domain information, a password, an access token, etc.) required when the electronic device is coupled to an external electronic device (e.g., the first electronic device 10).

According to some embodiments, the processor may display a popup window on a display to inquire whether to download the profile, and may perform operation 1405 (a profile transmission request) according to a user's selection.

In operation 1407, the processor according to an embodiment of the disclosure may receive the profile from the access authentication server. The received profile may be stored in a memory.

In operation 1409, the processor according to an embodiment of the disclosure may identify whether automatically connectable external devices (e.g., the first electronic device of FIG. 10, the first electronic device 10 of FIG. 11A) are searched (or scanned).

If it is identified in operation 1409 that the external device is not found, the processor may maintain operation 1409. Otherwise, if it is identified in operation 1409 that the external device is found, in operation 1411, the processor may transmit an access request of a wireless network. For example, the processor may transmit the access request of the wireless network to the found external device by using the profile.

In operation 1413, the processor according to an embodiment of the disclosure may identify whether the access request is approved. If it is identified in operation 1413 that the access request is approved, in operation 1415, the processor may use the Internet upon completion of an automatic access to the external device. Otherwise, if it is identified in operation 1413 that the access request is not approved, in operation 1417, the processor may output an error message, and return to operation 1409.

A wireless communication connection control method of an electronic device (e.g., the second electronic device 20 of FIG. 10 to FIG. 12B) according to various embodiments of the disclosure may include: receiving an invitation message for reporting that an access to the external electronic device and the wireless communication network is available; notifying the reception of the invitation message via the display in a visible manner; and receiving a profile including information required for the access to the external electronic device by requesting a pre-designated server to transmit the profile.

The method according to various embodiments may further include: requesting the external electronic device to access a wireless network by using the profile; and upon receiving an access permission message from the external electronic device, accessing an access point of the external electronic device to use the Internet.

The receiving of the invitation message according to various embodiments may include receiving the invitation message as at least one of a text message, an SNS message, an e-mail, and a push message.

The profile according to various embodiments may include at least one of account information, domain information, password, and access token of the external electronic device.

The receiving of the profile by requesting the pre-designated server to transmit the profile according to various embodiments may include: outputting a popup window at one side of the display to inquire whether to download the profile; and determining whether to download the profile according to a user's selection.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130, the memory 230, the memory 420, the memory 520, the memory 620, the memory 720, the memory 820, the memory 920, the memory 1020) as a program module. When the instruction is executed by a processor (e.g., the processor 120, the processor 210, the processor 410, the processor 510, the processor 610, the processor 710, the processor 810, the processor 910, the processor 1010), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the specification and drawings merely present specific examples to easily explain details of the present invention and to ease the understanding, and do not limit the range of the present invention. Therefore, the scope of the present invention should be construed as encompassing all modifications or modified forms derived based on the technical idea of the present invention as well as the disclosed embodiments.

What is claimed is:

1. An electronic device for Internet access control, the electronic device comprising:
   a housing; and
   an access point inside the housing,
   wherein the access point comprises:
      a wired communication interface configured to be coupled to the Internet;
      a wireless communication circuit configured to support a WiFi protocol;
      a processor operatively coupled to the wired communication interface and the wireless communication circuit; and
      a memory operatively coupled to the processor,
   wherein the memory stores instructions, when executed, for allowing the processor to:
      receive at least one first account information stored in at least one server from a first electronic device via the wireless communication circuit;
      store the first account information in the memory;
      broadcast a WiFi beacon signal including an indicator indicating that WiFi access to the access point is granted or grantable based at least in part on account information related to the server via the wireless communication circuit;
      receive, in response to the WiFi beacon signal, at least one second account information from a second electronic device via the wireless communication circuit;
      determine whether the second account information is related to the first account information, based at least in part on a type of data to be exchanged with the server via the wired communication interface;
      based on determining that the second account information is related to the first account information, grant the second electronic device access to the access point in accordance with the first account information, without requesting credential information from the second electronic device, and transmit a signal to the second electronic device indicating that access to the access point is granted;

based on determining that the second account information is not related to the first account information, not grant the second electronic device access to the access point, and transmit a signal to the second electronic device indicating that access to the access point is not granted; and based on the granting, establish a wireless communication connection with the second electronic device to provide Internet access to the second electronic device via the wired communication interface of the access point.

2. The electronic device of claim 1, wherein the beacon signal includes a Vender-Specific Information Element (VSIE) including the indicator.

3. The electronic device of claim 1, wherein the first account information includes a first user IDentifier (ID), and the second account information includes a second user ID.

4. The electronic device of claim 3, wherein the instructions allow the processor to exchange the data with the server by using an Application Programming Interface (API) associated with the server.

5. The electronic device of claim 4, wherein the data includes an indication which indicates that the second user ID is linked with the first user ID.

6. The electronic device of claim 1, wherein the determining of whether the second account information is related to the first account information comprises determining at least one matched account information based on the number of the first account information and/or the second account information being plural, and determining whether the second account information is related to the first account information using the determined at least one matched account information.

7. The electronic device of claim 6,
wherein the first account information and the second account information include a server identifier for identifying a server, and
wherein the matched account information includes the same server identifier.

8. The electronic device of claim 1, wherein the determining of whether the second account information is related to the first account information comprises receiving a temporary account verify key from the second electronic device via the wireless communication circuit, and determining whether the second account information is related to the first account information by requesting the server to authenticate the temporary account verify key.

9. An electronic device for Internet access control, the electronic device comprising:
a housing; and
an access point inside the housing,
wherein the access point comprises:
a wired communication interface configured to be coupled to the Internet;
a wireless communication circuit configured to support a WiFi protocol;
a processor operatively coupled to the wired communication interface and the wireless communication circuit; and
a memory operatively coupled to the processor, wherein the memory stores instructions, when executed, for allowing the processor to:

receive at least one first account information related to at least one reservation server from a first electronic device via the wireless communication circuit;

log in to the reservation server using the at least one account information;

receive an enable request, including at least one first reservation information, for a function which grants WiFi access, based at least in part on reservation information, from the reservation server;

store the first reservation information in the memory;

after enabling the function, broadcast a WiFi beacon signal including an indicator indicating that WiFi access to the access point is granted or grantable based at least in part on reservation information via the wireless communication circuit;

receive, in response to the WiFi beacon signal, at least one second reservation information from a second electronic device via the wireless communication circuit;

determine whether the second reservation information is related to the first reservation information, based at least in part on a type of data to be exchanged with the reservation server via the wired communication interface;

based on determining that the second reservation information is related to the first reservation information, grant the second electronic device access to the access point based on the first reservation information, without requesting credential information from the second electronic device, and transmit a signal to the second electronic device indicating that access to the access point is granted;

based on determining that the second reservation information is not related to the first reservation information, not grant the second electronic device access to the access point, and transmit a signal to the second electronic device indicating that access to the access point is not granted; and based on the granting, establish a wireless communication connection with the second electronic device to provide Internet access to the second electronic device via the wired communication interface of the access point.

10. The electronic device of claim 9, wherein the memory further stores an instruction for allowing the processor to block access of the second electronic device based on receiving an access block request from the reservation server via the wired communication interface.

11. An electronic device for Internet access control, the electronic device comprising:
a housing; and
an access point inside the housing,
wherein the access point comprises:
a wired communication interface configured to be coupled to the Internet;
a wireless communication circuit configured to support a WiFi protocol;
a processor operatively coupled to the wired communication interface and the wireless communication circuit; and
a memory operatively coupled to the processor,
wherein the memory stores instructions, when executed, for allowing the processor to:

connect a communication channel with a first electronic device coupled with a payment server via the wireless communication circuit;

receive at least one first payment approval information from the first electronic device;

store the first payment approval information in the memory;

broadcast a WiFi beacon signal including an indicator indicating that WiFi access to the access point is granted or grantable based at least in part on payment approval information via the wireless communication circuit;

receive, in response to the WiFi beacon signal, at least one second payment approval information from a second electronic device via the wireless communication circuit;

determine whether the second payment approval information is related to the first payment approval information, based at least in part on a type of data to be exchanged with the payment server via the wired communication interface;

based on determining that the second payment approval information is related to the first payment approval information, grant the second electronic device access to the access point in accordance with the first payment approval information, without requesting credential information from the second electronic device, and transmit a signal to the second electronic device indicating that access to the access point is granted;

based on determining that the second payment approval information is not related to the first payment approval information, not grant the second electronic device access to the access point, and transmit a signal to the second electronic device indicating that access to the access point is not granted; and based on the granting, establish a wireless communication connection with the second electronic device to provide Internet access to the second electronic device via the wired communication interface of the access point.

12. The electronic device of claim 11, wherein the first payment approval information and the second payment approval information include a payment approval date and time, and wherein the granting of Internet access to the second electronic device comprises granting Internet access during a designated period, based at least in part on the payment approval date and time.

13. An electronic device for Internet access control, the electronic device comprising:

a housing; and an access point inside the housing, wherein the access point comprises:

a wired communication interface configured to be coupled to the Internet;

a wireless communication circuit configured to support a WiFi protocol;

a processor operatively coupled to the wired communication interface and the wireless communication circuit; and a memory operatively coupled to the processor, wherein the memory stores instructions, when executed, for allowing the processor to:

receive an access request including account information from at least one different electronic device via the wireless communication circuit;

transmit to a pre-designated server a query message for inquiring whether to grant access to the access point for the different electronic device;

grant the different electronic device the access to the access point in order to use the Internet or block the access, without requesting credential information input by a user of the different electronic device, based on a response message received from the server; and based on granting the different electronic device the access to the access point, establish a wireless communication connection with the different electronic device to provide the Internet access to the different electronic device via the wired communication interface of the access point.

14. The electronic device of claim 13, wherein the memory further stores account information of a user of the electronic device and domain information of the electronic device.

15. The electronic device of claim 13, wherein the memory further stores instructions, when executed, for allowing the processor to receive a wireless network access request from the different electronic device, and to transmit a response signal to the different electronic device by identifying whether it is a device which is automatically accessible to the electronic device.

16. An electronic device for Internet access control, the electronic device comprising:

a display;

a mobile communication circuit;

a wireless communication circuit configured to support a WiFi protocol;

a processor operatively coupled to the mobile communication circuit and the wireless communication circuit; and a memory operatively coupled to the processor, wherein the memory stores instructions, when executed, for allowing the processor to:

receive an invitation message for reporting that access to the external electronic device and the wireless communication network is available via the mobile communication circuit or the wireless communication circuit;

notify the reception of the invitation message via the display in a visible manner;

receive a profile including information required for the access to the external electronic device by requesting a pre-designated server to transmit the profile;

request the external electronic device to access a wireless network by using the profile in response to searching for the external electronic device; and based on receiving an access permission message from the external electronic device, access an access point of the external electronic device to use the Internet.

17. The electronic device of claim 16, wherein the invitation message is received as at least one of a text message, an SNS message, an e-mail, or a push message.

18. The electronic device of claim 16, wherein the profile includes at least one of account information, domain information, password, or access token of the external electronic device.

* * * * *